(12) United States Patent
Kadoya et al.

(10) Patent No.: US 6,744,164 B2
(45) Date of Patent: Jun. 1, 2004

(54) MOTOR, ELECTRIC VEHICLE AND HYBRID ELECTRIC VEHICLE

(75) Inventors: Naoyuki Kadoya, Osaka (JP); Yasuhiro Kondo, Osaka (JP); Masaki Tagome, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/863,131

(22) Filed: May 23, 2001

(65) Prior Publication Data

US 2002/0047429 A1 Apr. 25, 2002

(30) Foreign Application Priority Data

May 24, 2000 (JP) .................................. 2000-153852
May 24, 2000 (JP) .................................. 2000-153853

(51) Int. Cl.[7] ......................... H02K 16/02; H02K 1/27
(52) U.S. Cl. ................... 310/114; 310/112; 310/156.01
(58) Field of Search ................... 310/114, 156, 310/112; H02K 16/02

(56) References Cited

U.S. PATENT DOCUMENTS

| | | | | |
|---|---|---|---|---|
| 4,578,609 A | * | 3/1986 | McCarty | 310/156.24 |
| 5,168,190 A | * | 12/1992 | Bahn | 310/166 |
| 5,191,256 A | * | 3/1993 | Reiter et al. | 310/156.49 |
| 5,508,576 A | * | 4/1996 | Nagate et al. | 310/156.54 |
| 5,914,548 A | * | 6/1999 | Watanabe et al. | 310/88 |
| 6,054,775 A | * | 4/2000 | Vocaturo | 290/1 A |
| 6,252,331 B1 | * | 6/2001 | Mildice et al. | 310/263 |
| 6,326,713 B1 | * | 12/2001 | Judson | 310/112 |

FOREIGN PATENT DOCUMENTS

| | | | | |
|---|---|---|---|---|
| JP | 02119544 A | * | 5/1990 | ............ H02K/1/27 |
| JP | 7-59310 | | 3/1995 | |
| JP | 9-294362 | | 11/1997 | |
| JP | 2000-50584 | | 2/2000 | |
| JP | 2000050584 A | * | 2/2000 | ............ H02K/16/02 |

OTHER PUBLICATIONS

B. Chalmers et al., "Variable–Frequency Synchronous Motor Drives for Electric Vehicles," Jul./Aug., 1996, vol. 32, No. 4, pp. 896–903.

* cited by examiner

Primary Examiner—Burton S. Mullins
Assistant Examiner—J. Aguirrechea
(74) Attorney, Agent, or Firm—Ratner Prestia

(57) ABSTRACT

A motor according to the present invention is a motor using a rotor 5 including two first rotator portions 2, each having a permanent magnet 1, and a second rotator portion 3 having magnetic saliency inserted therebetween, coupled in a direction of a rotating shaft 4, and part of the rotor 5 is replaced with a reluctance motor, whereby an amount of the permanent magnet 1 is reduced, thus making it possible to reduce generated voltage. Further, there are provided the first rotator portion 2 on both sides of the second rotator portion 3, whereby the second rotator portion 3 is magnetically saturated through the effective use of going-round 18 of magnetic flux to raise salient ratio. Thus, reluctance torque caused in the second rotator portion 3 is increased, whereby it is possible to increase torque as a whole and to obtain a high-output motor.

8 Claims, 22 Drawing Sheets

MOTOR, ELECTRIC VEHICLE AND HYBRID ELECTRIC VEHICLE

BACKGROUND OF THE INVENTION

1. Field of the Invention

The present invention relates to a motor mainly for use with the electric vehicle or the like, an electric vehicle and a hybrid electric vehicle.

2. Description of the Related Art

Conventionally, an internal combustion engine has generally been used as a prime mover for an automobile.

In recent years, air pollution, global atmospheric warming-up or the like have become an issue, and in terms of protection of global environment, development of an electric vehicle using an electric motor as its prime mover has been proceeding.

Among others, it is an electric vehicle such as a fuel-cell electric vehicle using a fuel cell as power supply and a hybrid electric vehicle using a battery as power supply that have been in the limelight for the last several years.

In the case of the former fuel-cell electric vehicle, since a motor is used for the power, there is no exhaust gas at all, both vibration and noise are exceedingly low as compared with the internal combustion engine, and in addition, a fuel cell having greater energy density than an ordinary battery is used as power supply, and therefore, there is the advantage that the fuel-cell electric vehicle has much longer travel distance per charging.

Also, as the latter hybrid electric vehicle, there has been developed a parallel hybrid electric vehicle or the like which directly drives drive wheels by combining a conventional engine, which is easy to supply fuel, with a motor, which is clean as energy, to use these power (Japanese Patent Laid-Open No. 59-63910 and U.S. Pat. No. 4,533,011).

In this respect, the entire disclosure of the Japanese Patent Laid-Open No. 59-63910 and U.S. Pat. No. 4,533,011 is incorporated herein by reference in its entirety.

As the structure of such a hybrid electric vehicle, there has generally been known a vehicle in which driving by the motor or driving by the engine is appropriately switched in accordance with various conditions such as traveling speed and travel area through the use of connection such as clutch to transmit driving forces (mechanical power) of those engine and motor to the drive wheels through power transmitting means such as transmission for traveling.

Also, in this sort of hybrid electric vehicle, the motor is caused to generate a driving force during, for example, acceleration of the vehicle, and it is added to an output from the engine to transmit to the drive wheels, whereby while acceleration performance to be required of the vehicle is being secured, the engine's output is restrained, and reduction in fuel consumption and exhaust gas of the engine is planned.

Further, in the case of the hybrid electric vehicle, during, for example, deceleration of the vehicle, it is common practice to drive the motor as a generator for regenerative power generation by means of kinetic energy of the vehicle to be transmitted to the motor from the drive wheels through the power transmitting means, and to recover the regenerative power generation out put thus obtained for accumulation. Concretely, the recovered power is directly accumulated in electric energy storing means itself such as the power supply battery for the motor.

In contrast, a method and structure for recovering and accumulating regenerative power in the case of the fuel-cell automobile are different from the case of the hybrid electric vehicle.

Concretely, the fuel cell itself is provided with an auxiliary cell or the like for exclusive use in storing regenerative power because it is not capable of directly receiving any regenerative power structurally.

As a motor for power for such a fuel-cell automobile, however, a small-sized, high-output, high-efficiency interior permanent magnet motor is optimum, but when a rotor of the motor is rotating during traveling or during regenerative control, a permanent magnet rotor generates generated voltage. This generated voltage is applied to the power supply (fuel cell) through an invertor as reverse generated voltage. Since the fuel cell is vulnerable to overvoltage and is not capable of directly receiving any regenerative power structurally as described above, an auxiliary cell or the like are connected to return the regenerative power (see FIG. 4).

In this respect, it is possible in principle to prevent the reverse generated voltage from the motor from being applied to the fuel cell by separately providing switching means between the motor and the fuel cell to electrically separate both, but here, the description has been made of a general case where such switching means is not provided.

Therefore, the reverse generated voltage is also applied to the fuel cell during ordinary traveling or during regenerative control. However, since the motor does not rotate at much high speed during ordinary traveling or during regenerative control at ordinary speed, the reverse generated voltage generated by the motor has a low value, and there arises no problem even if the reverse generated voltage is applied to the fuel cell itself.

However, during traveling at high speed, that is, when the motor is rotating at high speed, high reverse generated voltage is applied to the fuel cell. Thus, when a value of such reverse generated voltage exceeds the cell voltage, the motor becomes unable to rotate, and therefore, when the motor should be rotated at higher speed, so-called "field weakening control" is performed as control to advance current phase, to thereby restrain generated voltage generated to be low.

If, however, a power control unit such as an invertor should be out of order and become unable to be controlled during such traveling at high speed, considerably high reverse generated voltage would be applied to the fuel cell, which is very dangerous.

On the other hand, although supposing such a trouble case, it is possible to use a motor, in which low generated voltage is generated, in order to make the generated voltage low, it is necessary to reduce a number of flux interlinkage of the stator winding. Therefore, it is necessary to use a permanent magnet having lower characteristic, or to reduce an amount of permanent magnet used or to reduce a number of turns of the stator winding, and therefore, there is a problem that the motor becomes a low-output, low-efficiency and low-performance motor, through which high input current flows (first problem).

On the other hand, in the above-described hybrid electric vehicle, when auxiliary output is caused by driving the motor during acceleration of the vehicle, the motor consumes a comparatively large amount of electrical energy of electric energy storing means of supplying electric power such as the battery. Therefore, when the motor is caused to generate auxiliary output in a state in which a small amount of electric energy is stored in the electric energy storing means during acceleration of the vehicle, during acceleration of the vehicle, the electric energy storing means is prone to be deteriorated.

Accordingly, in such a case, it is considered preferable to place the motor in an operation-stopped state (energizationinterrupted state of motor) without generating auxiliary output by the motor.

Also, during cruising (during constant-speed traveling) of the hybrid electric vehicle, it is possible to travel the vehicle without a hitch only with the output of the engine concerned while fuel consumption of the engine is being made sufficiently low, and since consumption of electric energy of the electric energy storing means more than necessary is prone to deteriorate the electric energy storing means, the motor is generally caused to be in an operation-stopped state.

In the conventional hybrid electric vehicle, however, when the vehicle is traveling through the use of the engine output, the rotor of the motor is adapted to always rotate in synchronization with an output shaft of the engine. The rotor of the motor is directly coupled to the output shaft of the engine, or is connected to the engine output shaft through a gear or the like (see, for example, Japanese Patent Laid-Open Application Nos. 8-193531 and 9-14360).

In this respect, the entire disclosure of the Japanese Patent Laid-Open Nos. 8-193531 and 9-14360 is incorporated herein by reference in its entirety.

For this reason, in the conventional hybrid electric vehicle, when the motor has been caused to be in an operation-stopped state in accordance with a traveling state of the vehicle, an energy-stored state (for example, remaining capacity of the battery) or the like of the electric energy storing means during traveling of a vehicle using the output of the engine, the rotor of the motor has become a load of the engine, which has become one factor for increasing fuel consumption of the engine.

In the case where a magneto electric motor is particularly used as a motor, when a rotor of the electric motor directly coupled to a driving shaft of the vehicle or a driving system rotates, magnetic flux, which interlinks with a stator of a permanent magnet provided on the rotor, causes iron loss in the stator of the electric motor.

Since it occurs even if the motor is not energized, this iron loss lowers the engine efficiency because the motor generates heat. Thus, the travel distance per charging is shortened, and therefore, this is a problem of the hybrid electric vehicle (second problem).

As a solution to such a problem, it seems to be considered to use a reluctance motor using no magnet at all, but when the reluctance motor is used, the size of the motor becomes comparatively large in order to obtain required output.

The hybrid electric vehicle has no room as the vehicle space because it is mounted with two driving systems: internal combustion engine(ICE) and electric motor as a traveling source. Therefore, it is not desirable as described above that the motor becomes large in size, but it is difficult to use the reluctance motor.

Further, if the motor is not properly controlled due to malfunction of a micro computer control circuit, when the hybrid electric vehicle is traveling at high speed only by the output of the ICE, the following problem will occur. More specifically, since the rotor of the motor is adapted to always rotate in synchronization with the output shaft of the engine structurally, the motor is driven as a generator for regenerative power generation so that excessive voltage is applied to the electric energy storing means such as a power supply battery. In this case, particularly a sufficient amount of electric energy stored by the electric energy storing means leads to deterioration or damage of the electric energy storing means, which possibly may result in a dangerous state (third problem).

BRIEF SUMMARY OF THE INVENTION

The present invention has been achieved in order to solve the above-described conventional problem, and is aimed to provide a small-sized, high-output and high-efficiency motor capable of restraining generated voltage generated to be equal to or less than, for example, voltage of a fuel cell even when the rotor is rotating at high speed during high-speed traveling of, for example, an automobile (electric vehicle such as a fuel-cell automobile, or hybrid electric vehicle), and moreover the output of which does not lower.

Also, it is an object of the present invention to contribute to enhancement of performance and safety of a fuel-cell automobile using such a motor.

Also, the present invention has been achieved in the light of such conventional problems, and is aimed to enable efficiency and safety in a hybrid electric vehicle system to be enhanced and secured respectively.

One aspect of the present invention is a hybrid electric vehicle, comprising:

a rotor, comprising a plurality of first rotator portions, each having a permanent magnet, and one or a plurality of second rotator portions, each having magnetic saliency, said first and second rotator portions have been arranged adjacent to each other in a direction of a rotating shaft; and a stator which generates a magnetic field for driving said rotor when electric current is supplied.

A first motor according to the present invention is, because of the above-mentioned structure, capable of reducing an amount of permanent magnet of the entire rotor to restrain occurrence of generated voltage by making part of the rotor into the reluctance motor even if the rotor rotates at high speed during high-speed traveling. Therefore, even if an electric power converting unit such as an invertor should be out of order and become unable to be controlled, there is no problem in safety because the reverse generated voltage to be applied to the fuel cell is restrained to be equal to or less than its cell voltage.

Also, since it is provided with a permanent magnet, a first rotator portion can be made into a high-output and high-efficiency motor. Further, the first rotator portion has saliency by embedding a permanent magnet therein, and is capable of utilizing the reluctance torque in addition to the magnet torque, and a higher-output, and higher-efficiency motor can be obtained. In this respect, a second rotator portion is constructed to have magnetic saliency by providing the rotator with irregularity geometrically or providing a slit within the rotator or the like.

Another aspect of the present invention is the motor, wherein said plurality of first rotator portions are not arranged adjacent to each other.

A motor according to the present invention is, because of the above-described structure, capable of raising a salient pole ratio of the second rotator portion to thereby increase reluctance torque caused in the second rotator portion by causing leakage flux of a permanent magnet further disposed in the first rotator portion in addition to the above-described effect to go round to the second rotator portion from both sides to magnetically saturate the second rotator portion.

Therefore, the motor can be made into a small-sized, high-torque, high-output and high-efficiency motor at low generated voltage, and the motor size can be also further reduced.

Also, when there are a plurality each of the first rotator portions and the second rotator portions, magnetic saturation is performed by leakage flux as described above, and a number of the second rotator portions are improved in salient pole ratio and reluctance torque, and therefore, the motor becomes a higher-torque, higher-output, higher-efficiency motor at low generated voltage, and can be further miniaturized.

Still another aspect of the present invention is the motor, wherein said first rotator portion and said second rotator portion are magnetically combined.

A motor according to the present invention is, because of the above-described structure, capable of raising a salient pole ratio of the second rotator portion to thereby increase reluctance torque caused in the second rotator portion by causing leakage flux of a permanent magnet further disposed in the first rotator portion in addition to the above-described effects to go round to the second rotator portion to magnetically saturate the second rotator portion.

Therefore, the motor can be made into a high-torque, high-output and high-efficiency motor at low generated voltage, and the motor size can be also miniaturized.

Yet another aspect of the present invention is the motor,
  wherein said second rotator portion has a shape of having a plurality of inverted-circular arc-shaped notches on a circumferential portion of a circular plate or a cylindrical column, and
  a full or partial contour portion of said notch is provided at a position whereat said full or partial contour portion opposes to said permanent magnet.

A motor according to the present invention is, because of the above-described structure, capable of raising a salient pole ratio of the second rotator portion to thereby increase reluctance torque caused in the second rotator portion by causing main magnetic flux of a permanent magnet disposed in the first rotator portion in addition to the above-described effect to flow into the stator side, causing leakage flux to go round to the second rotator portion effectively to magnetically saturate the second rotator portion.

Therefore, the motor can be made into a high-torque, high-output and high-efficiency motor at low generated voltage, and the motor size can be also miniaturized.

Still yet another aspect of the present invention is the motor, wherein said first rotator portion and said second rotator portion are arranged adjacent to each other in such a manner that current phases for generating their both maximum torque become actually in the same phase.

A motor according to the present invention is, because of the above-described structure, capable of being made into a higher-torque, higher-output and higher-efficiency motor at low generated voltage by causing current phases for generating respective maximum torque of the first rotator portion and the second rotator portion to be in the same phase with each other in addition to the above-described effects. The motor size can be also further miniaturized.

A further aspect of the present invention is the motor, wherein said stator has a stator winding of distributed winding or a stator winding of concentrated winding.

A motor according to the present invention is, when the stator has a stator winding of distributed winding, capable of being made into a motor having small cogging torque and torque ripple, and on the other hand, is, when the stator has a stator winding of concentrated winding, capable of being made into a high-torque motor, a motor-installing method of which is simple and easy.

A still further aspect of the present invention is a driving unit equipped with a motor, and a fuel cell as power supply for said motor.

A driving unit according to the present invention is, as described above, capable of being made into a small-sized, high-output and safe driving unit having longer travel distance per charging by combining a small-sized, high-torque, high-output and high-efficiency motor at low generated voltage with a fuel cell.

A yet further aspect of the present invention is an electric vehicle comprising a driving unit.

An electric vehicle according to the present invention is, because of the above-described structure, capable of being made into a small-sized, high-output and safe fuel-cell electric vehicle having long travel distance per charging.

A still yet further aspect of the present invention is a hybrid electric vehicle, comprising:
  electric energy storing means of storing electric power;
  a motor for driving through the use of electric power of said electric energy storing means;
  motor control means of controlling said motor;
  a power regulator provided between said motor and said electric energy storing means, for converting their both power;
  an engine for driving using fuel; and
  engine control means of controlling said engine, wherein said hybrid electric vehicle being traveling through the use of a driving force of said motor and a driving force of said engine, and
  wherein said motor has:
    (1) a rotor comprising a first rotator portion having a permanent magnet and a second rotator portion having magnetic saliency coupled in the direction of a rotating shaft; and
    (2) a stator which generates magnetic a field for driving said rotor.

An additional aspect of the present invention is the hybrid electric vehicle, wherein said first rotator portion and said second rotator portion are coupled at such a mechanical angle that a current phase with which maximum torque of said first rotator portion occurs, and a current phase with which maximum torque of said second rotator portion occurs become actually in the same phase.

A still additional aspect of the present invention is the hybrid electric vehicle, further comprising:
  abnormality monitoring means of monitoring occurrence of an abnormal state in said electric energy storing means; and
  power regulator control means of controlling an operation of said power regulator on the basis of a signal from said abnormality monitoring means.

A yet additional aspect of the present invention is the hybrid electric vehicle, wherein said abnormality monitoring means has at least one means, of voltage monitoring means of monitoring voltage of said energy storing means, current monitoring means of monitoring current of said energy storing means, temperature monitoring means of monitoring temperature of said energy storing means, and power regulator monitoring means of monitoring abnormality of said power regulator.

A hybrid electric vehicle system according to the present invention having the above-described structure has a motor equipped with a rotor comprising a first rotator portion having a permanent magnet and a second rotator portion having magnetic saliency coupled in a direction of a rotating shaft, and a stator, which generates a magnetic-field for driving the rotor by supplying current, and is mounted on the vehicle with the output from the motor as the traveling source. Thereby, as the motor output, for example, leakage flux of a permanent magnet disposed in the first rotator portion is caused to go round to the second rotator portion 701 to magnetically saturate the second rotator portion, whereby a salient pole ratio of the second rotator portion is raised to thereby increase reluctance torque caused in the second rotator portion. Thus, high output can be realized, and therefore, even when the motor is rotated by the engine in a state in which the motor is in an operation-stopped state while the equal output to the hybrid electric vehicle system using a conventional magneto motor, is being maintained, an amount of magnet to be used for the rotor is reduced. Accordingly, it is possible to restrain generated voltage from being generated, and to reduce the iron loss.

[Description of Symbols]

Figure 1:
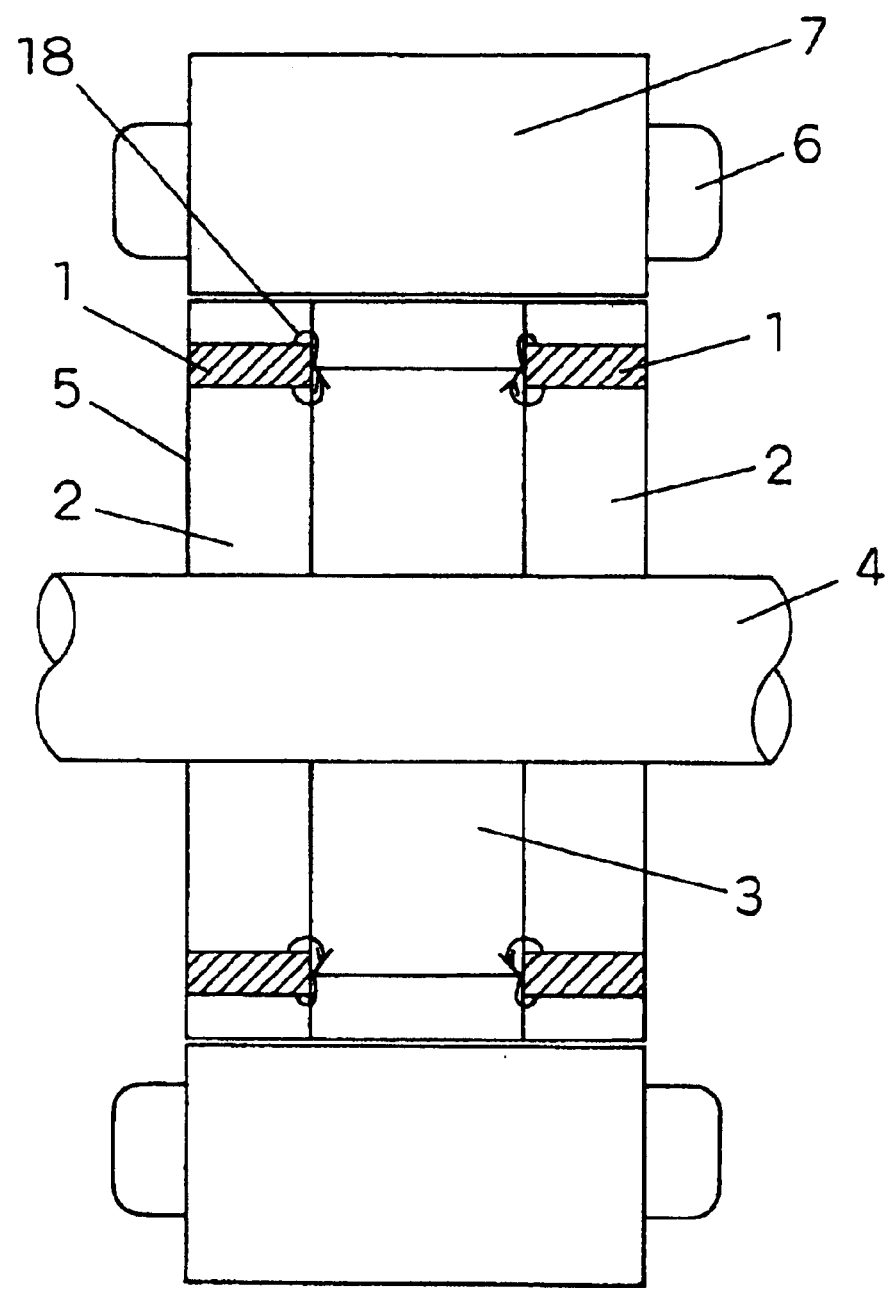
FIG. 1 is a sectional view showing a motor according to a first embodiment of the present invention.

1 permanent magnet
2 first rotator portions
3 second rotator portion
4 rotating shaft
5 rotor
6 winding
7 stator
8 rivet pin
9 notch
10 fuel cell
11 invertor
12 motor
13 driving shaft
14 differential gear
15 wheels
16 auxiliary cell
17 phase shift provided for maximum torque phases to be coincided
18 going-round of leakage flux
19 slit
20 outer periphery
101 engine
102 transmission
103 motor
104 power regulator
105 electric energy storing means
106 wheel
107 main body
201 electric energy storing means
202 IGBT
203 switching means
2010 abnormality monitoring means
2011 microcomputer abnormality monitoring means
2012 temperature sensor
2015 current detector
2019 position transducer

DETAILED DESCRIPTION OF THE PREFERRED EMBODIMENTS

Hereinafter, with reference to the drawings, the description will be made of embodiments of the present invention.
(First Embodiment)

FIG. 1 is a sectional view showing a motor according to an embodiment of the present invention.

Figure 12:
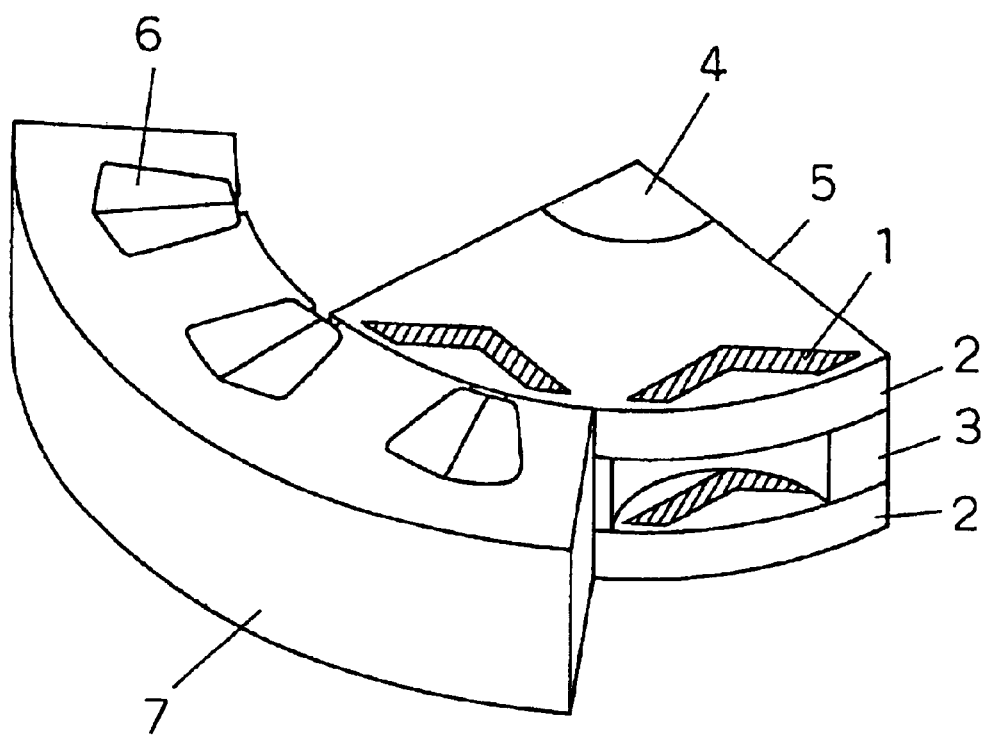
FIG. 12 is a partial perspective view showing the motor according to the first embodiment of the present invention.

FIG. 12 is a partial perspective view showing the motor according to the first embodiment.

A motor according to the present embodiment is, as shown in FIG. 1, provided with two first rotator portions 2, the saliency of which is provided by a permanent magnet 1, and between those two first rotator portions 2, there is arranged adjacent thereto a second rotator portion 3, which is provided with magnetic saliency by shaping (see FIG. 3) like a gear geometrically. Those two first rotator portions 2 and the second rotator portion 3 are coupled and fixed in the direction of the same rotating shaft 4 to constitute a rotor 5 (see FIG. 12).

The motor according to the present first embodiment is constituted by the above-described rotor 5 and a stator 7 for generating a magnetic field system, which drives the rotor 5 by supplying current to the winding 6.

Figure 2:
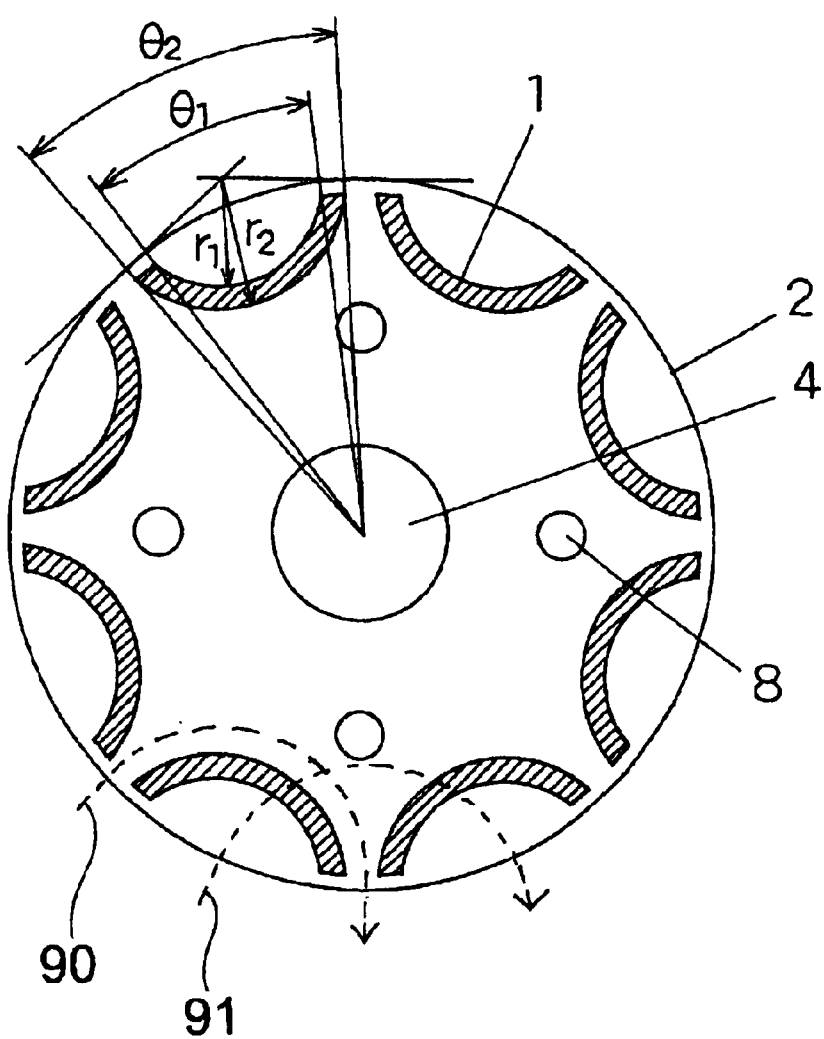
FIG. 2 is a front view showing a first rotator portion according to the first embodiment of the present invention.

The first rotator portion 2 is, as shown in FIG. 2, obtained by stacking electromagnetic steel plate, and is constructed such that a circular arc-shaped permanent magnet 1, which is convex inwardly, having end portions close to an outer periphery of the rotator portion 2 is embedded.

By taking such structure, the first rotator portion 2 has magnetic saliency, and generates magnetic torque and reluctance torque in synchronism with a magnetic field to be generated by the stator 7. Here, the magnetic saliency is a property that there is a difference in magnetic reluctance depending upon place. Concretely, in the case of the structure shown in FIG. 2, a path 90 of magnetic flux shown in the figure has no magnetic gap midway, and therefore, the magnetic flux easily passes (that is, low magnetic reluctance). In contrast, a path 91 has a permanent magnet 1 midway, and a magnetic gap exists, and therefore the magnetic flux is difficult to pass (that is, high magnetic reluctance).

Also, as shown in FIG. 2, there are provided through-holes between a rotating shaft 4 and the permanent magnet 1, and fastening means such as rivet pins 8 or bolts are inserted through these through-holes to fix a plurality of electromagnetic steel plates.

Figure 3:
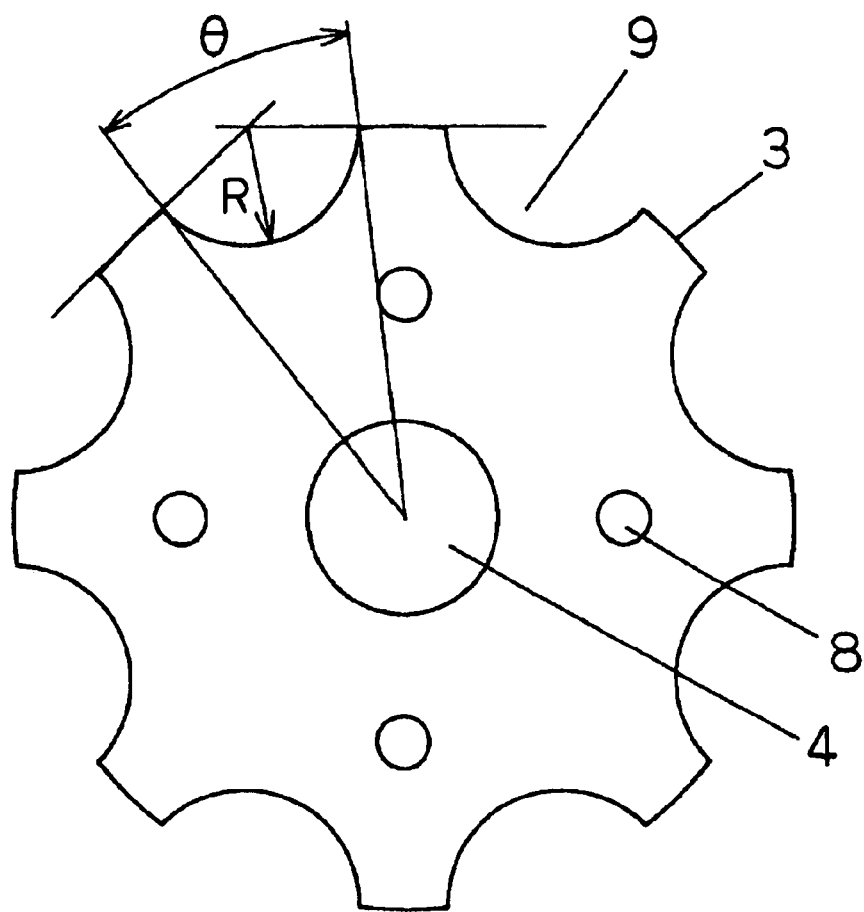
FIG. 3 is a front view showing a second rotator portion according to the first embodiment of the present invention.

The second rotator portion 3 is, as shown in FIG. 3, constructed such that notches 9 of a number corresponding to a number of the poles, each having a convex shape toward the rotating shaft 4 are provided on the outer periphery of the rotator portion 3 and the rotator portion 3 has magnetic saliency. In this respect, the second rotator portion 3 has no permanent magnet provided.

Assuming an inner diameter of the shape of the permanent magnet 1 to be r1, and an outer diameter to be r2, its angle of the inside to be θ1, and the angle of the outside to be θ2 as shown in FIG. 2, a diameter R of a shape of the notch 9 and its angle θ are assumed to satisfy the following relation Numerical Formula 1.

$$r1 \leq R \leq r2,\ \theta1 \leq \theta \leq \theta2 \qquad \text{(Numerical Formula 1)}$$

The second rotator portion 3 generates only reluctance torque in synchronism with the magnetic field to be generated by the stator 7 because of its magnetic saliency. The second rotator portion 3 generates no magnet torque because it has no permanent magnet 1.

The first rotator portions 2 and the second rotator portion 3 are fixed to the same rotating shaft 4, and rotate as one piece.

In the outside of the rotor 5, there is arranged a stator 7 wound with winding 6, and electric current is flowed through the winding 6 to thereby generate a magnetic field for rotationally driving the rotor 5.

Figure 4:
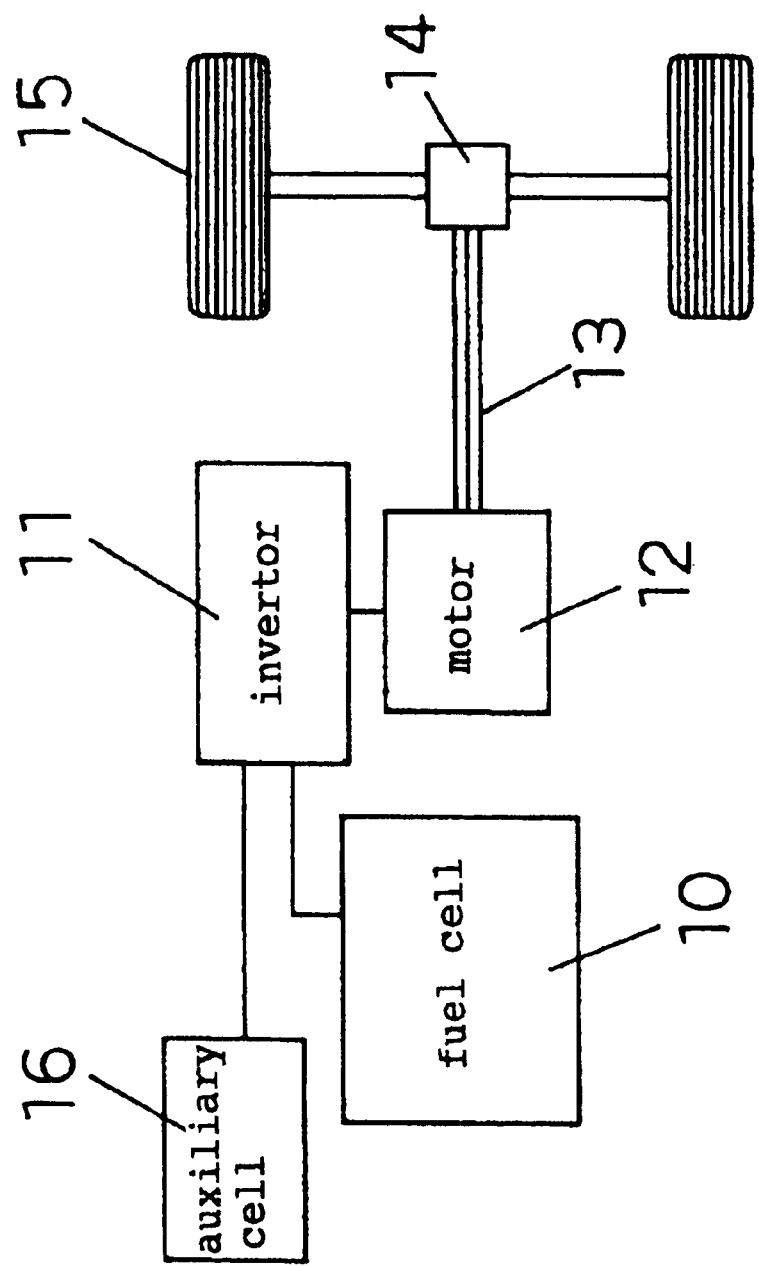
FIG. 4 is a block diagram showing a fuel-cell automobile driving system.

FIG. 4 shows structure of a driving unit for an electric vehicle with a fuel cell 10 as power supply. The fuel cell 10 is a device for taking out electric power by using hydrogen as fuel, and causing hydrogen to perform a reaction reverse to electrolysis with oxygen in air. Electric power generated from this fuel cell 10 is appropriately converted into electric power through an invertor 11, and is applied to a motor 12 to thereby drive the motor 12. The motor 12 is driven and rotated to rotate a driving shaft 13, and rotate wheels 15 through a differential gear 14 to cause the automobile to travel. When traveling, since the motor 12 is rotating, generated voltage is caused to apply a reverse generated voltage to the fuel cell 10.

In the present automobile, when a great accelerating force should be caused, a high current is flowed through the motor 12 to generate high torque in the motor 12. On the other hand, when the automobile should be slowed down, the back electromotive force generated is regenerated, but since regenerative power cannot be directly received in the fuel cell 10, an auxiliary cell 16 or the like is separately provided.

When the present automobile is accelerated to enter a high-speed traveling state, the wheels 15 and the driving shaft 13 rotate at high speed, and the rotor 5 of the motor 12 also rotates at high speed so that high generated voltage is generated in the motor 12, and high reverse generated voltage will be applied to the fuel cell 10. Since when this reverse generated voltage exceeds voltage of the fuel cell 10, the motor 12 becomes unable to rotate, when the motor 12 should be rotated at higher speed, the current phase is normally advanced to cancel a part of generated voltage of the motor 12 to perform so-called "field weakening control".

If, however, a power converting unit such as an invertor 11 should be out of order and become unable to be controlled during such high-speed traveling, considerably higher reverse generated voltage than the voltage of the fuel cell 10 will be applied thereto, and the fuel cell 10 is very dangerous because it is structurally vulnerable to overvoltage.

In a motor according to the present first embodiment, with the provision of the first rotator portion 2 having the permanent magnet 1 on both sides of the second rotator portion 3 having magnetic saliency, the second rotator portion 3 is magnetically saturated through the effective use of going-round 18 of leakage flux as shown in FIG. 1 to raise the salient pole ratio. Thus, it is possible to increase reluctance torque caused in the second rotator portion 3, and the motor is rotationally driven by making full use of not only the magnet torque, but also the reluctance torque. Therefore, the amount of the permanent magnet 1 is small for the size of the output torque.

In other words, the generated voltage generated when the rotor 5 rotates becomes low, and the reverse generated voltage to be applied to the fuel cell 10 can be also restrained. Therefore, even when the invertor 11 or the like should be out of order and become unable to be controlled during high-speed traveling, reverse generated voltage generated is low, and therefore, it is not dangerous for the fuel cell 10.

On actually designing the motor, a construction ratio of the first rotator portion 2 to the second rotator portion 3 will be determined in such a manner that no-load generated voltage during rotation at maximum speed becomes equal to or less than the fuel cell voltage.

In this respect, in consideration of only restraint of occurrence of generated voltage, it is ideal that for the rotor for the motor, only a rotor constructed to have magnetic saliency is used and that it is rotationally driven by the reluctance torque. In other words, even if the motor rotates at high speed during high-speed traveling, no generated voltage is generated because the rotor has no permanent magnet. With such structure, however, when an attempt is made to obtain the same output as a permanent magnet synchronous motor, which is rotationally driven through the use of conventional magnet torque, the motor size will become considerably large.

As a current tendency of automobiles, it is desired to make a size of the automobile itself small and to make indoor space of the automobile large, and it is not desirable that the motor size is too large and the indoor space is reduced. In the case of a fuel-cell automobile, since even only a complete set of fuel-cell device takes considerable space, the motor size is preferably as small as possible. Thus, there are provided two first rotator portions 2, each having a permanent magnet 1, and between those first rotator portions 2, a second rotator portion 3 having magnetic saliency is inserted, and a rotor 5 coupled in a direction of a rotating shaft 4 is used, whereby a high-output motor is constructed, enabling the motor size to become small, and motor voltage generated to become small.

Figure 6:
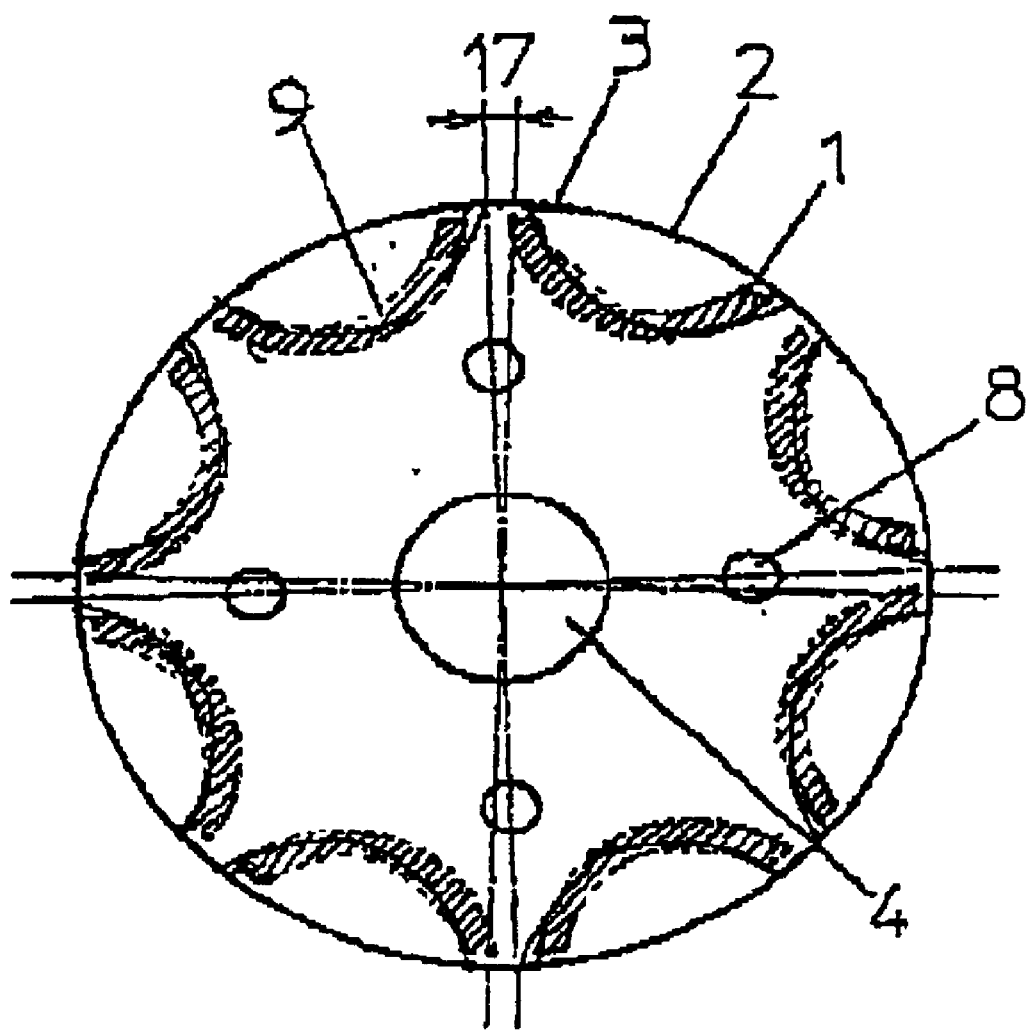
FIG. 6 is a front view showing another second rotator portion according to the first embodiment of the present invention.

Further, when the first rotator portion 2 is used by itself, a current phase for generating the maximum torque has generally an electric angle of 30° to 40°, and on the other hand, when the second rotator portion 3 is used by itself, a current phase for generating the maximum torque has generally an electric angle of about 50°, and normally both do not coincide with each other. In order to cause both current phases to coincide with each other, the second rotator portion 3 is provided with a phase shift 17 corresponding to a difference between the two as shown in FIG. 6, and the first rotator portion 2 and the second rotator portion 3 are coupled and fixed in a direction of the same rotating shaft 4 to constitute a rotor 5, whereby the maximum torque can be further increased and a higher-output motor can be manufactured with the motor size further reduced.

In this respect, according to the present embodiment, the first rotator portion 2 and the second rotator portion 3 are penetrated by a rivet pin 8, whereby they are fixed. For this reason, a position of a hole for the rivet pin 8 shown in FIG. 6 is deviated by a phase shift (attached with reference numeral 17 in FIG. 6) in anti-clockwise direction with the rotating shaft 4 being centered as described above from a position of a hole for the rivet pin 8 shown in FIG. 3.

Figure 5:
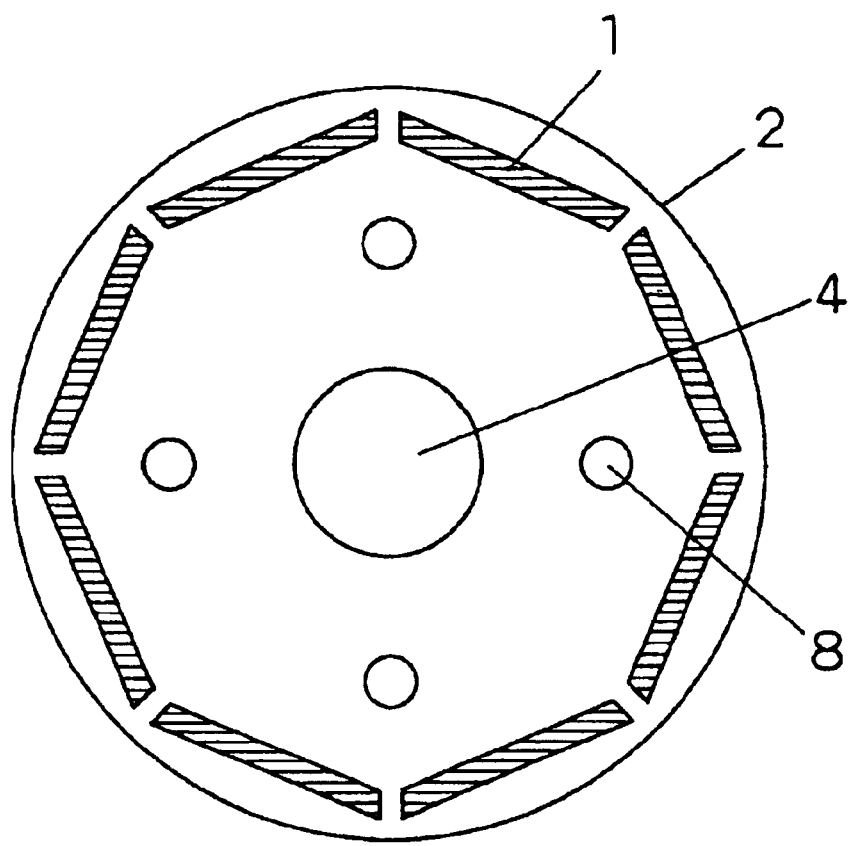
FIG. 5 is a front view showing another first rotator portion according to the first embodiment of the present invention.

In this respect, a shape of the permanent magnet 1 disposed in the first rotator portion 2 may be linear as shown in FIG. 5.

Figure 22:
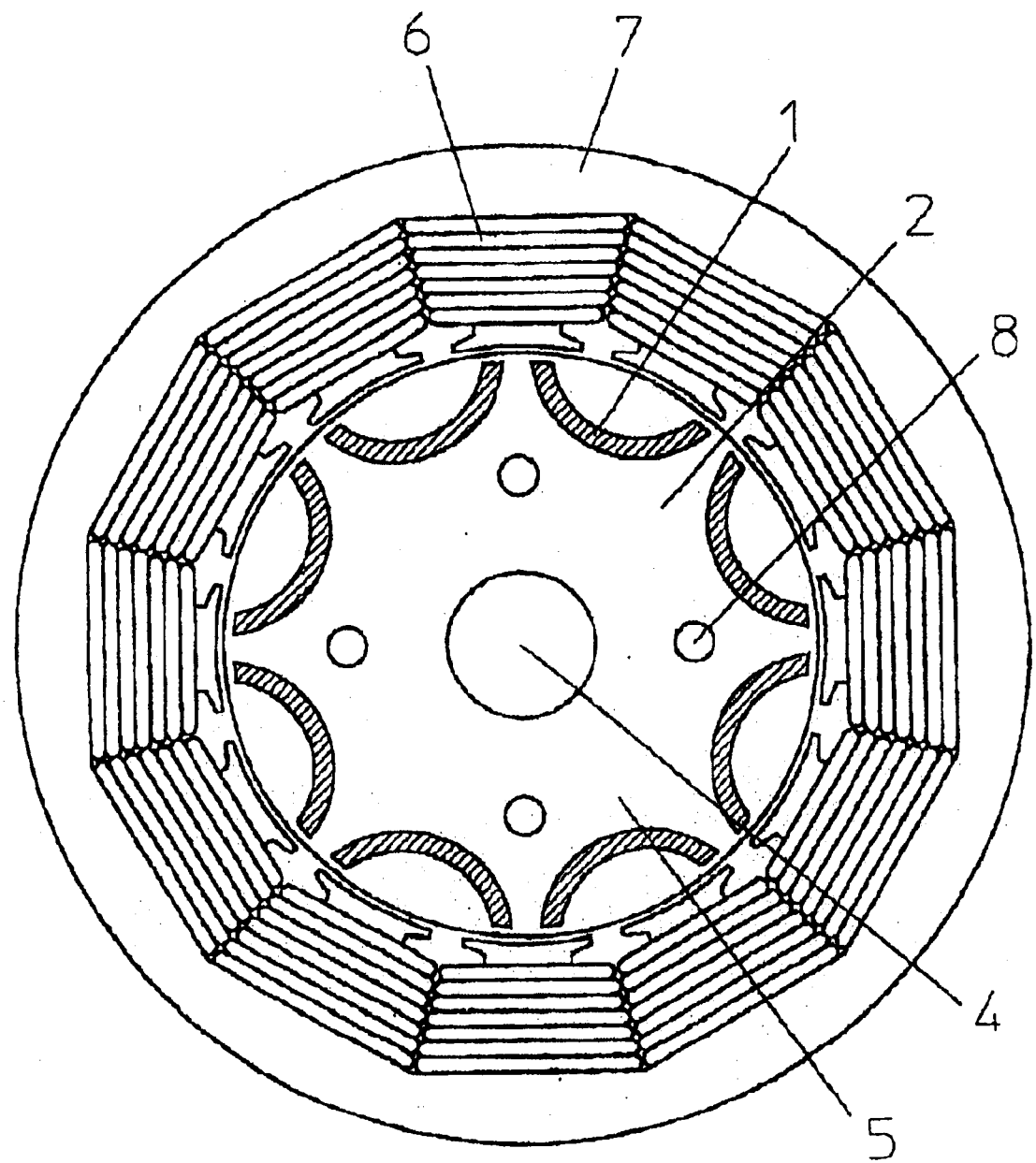
FIG. 22 is a front view of a motor including a stator having a distributed winding in accordance with an exemplary embodiment of the present invention.

Also, the stator winding 6 is made into a distributed winding (as illustrated in FIG. 22), whereby a motor further having small cogging torque and torque ripple in addition to the above-described effects can be obtained.

In contrast, the stator winding 6 is made into concentrated winding, whereby a motor, motor-assembling method of which is made simple and easy at high torque in addition to the above-described effects can be obtained.

Figure 13:
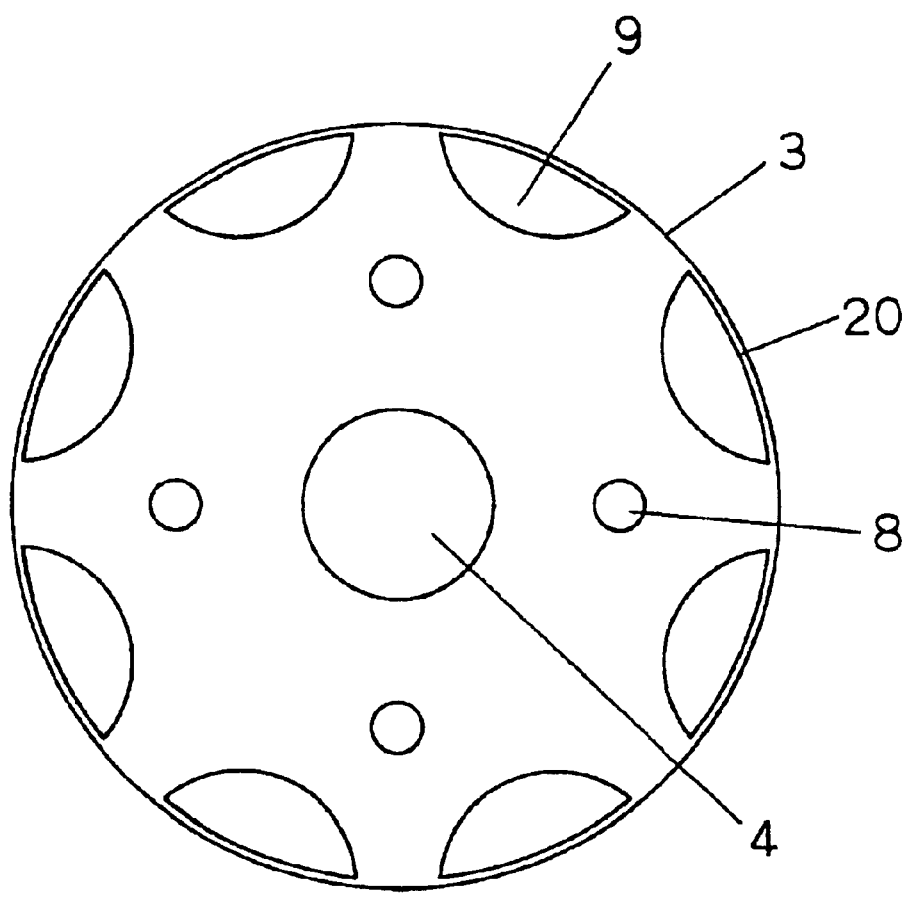
FIG. 13 is a front view showing another second rotator portion according to the first embodiment of the present invention.

In this respect, for the second rotor, a rotor, which has the outer periphery 20 with notch as shown in FIG. 13, may be used. By adopting such a shape, it is possible to reduce viscous resistance during rotation when used in viscous fluid as in the case of, for example, a hermetic motor for an air compressor in addition to the above-described effects, smaller than a notch shape without any outer periphery provided, making it possible to reduce the mechanical loss.

Figure 11:
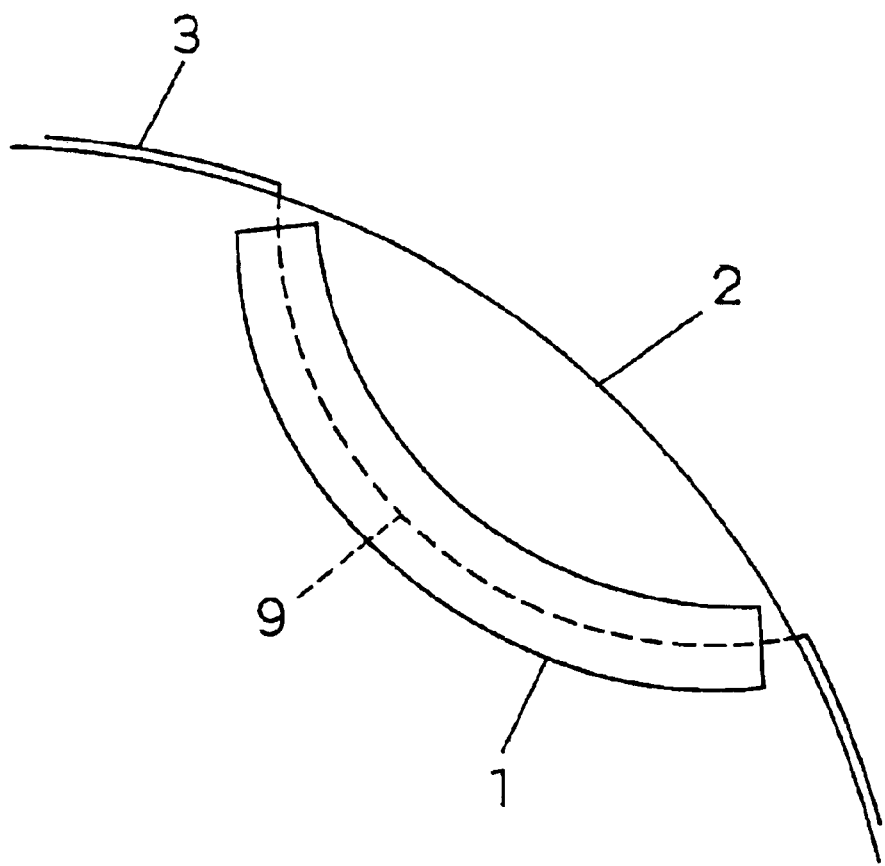
FIG. 11 is an explanatory view for illustrating coupling of the first rotator portion to the second rotator portion according to the first embodiment of the present invention.

Also, the first rotator portion 2 and the second rotator portion 3 are preferably stacked in such a manner that the permanent magnet 1 of the first rotator portion 2 and a contour of a notch 9 to which the second rotator portion 3 corresponds, overlap each other as shown in FIG. 11. In this respect, FIG. 11 shows an example, in which part of the contour of the notch 9 opposes to the permanent magnet 1, but the entire contour of the notch 9 may oppose to the permanent magnet 1.

In this respect, in the above-described embodiment, the description has been made of a case where the first rotator portion 2 has magnetic saliency, but the present invention is not limited thereto, but, for example, the structure may be arranged such that there is a plurality of permanent magnets are arranged to thereby eliminate the magnetic saliency.

(Second Embodiment)

Figure 7:
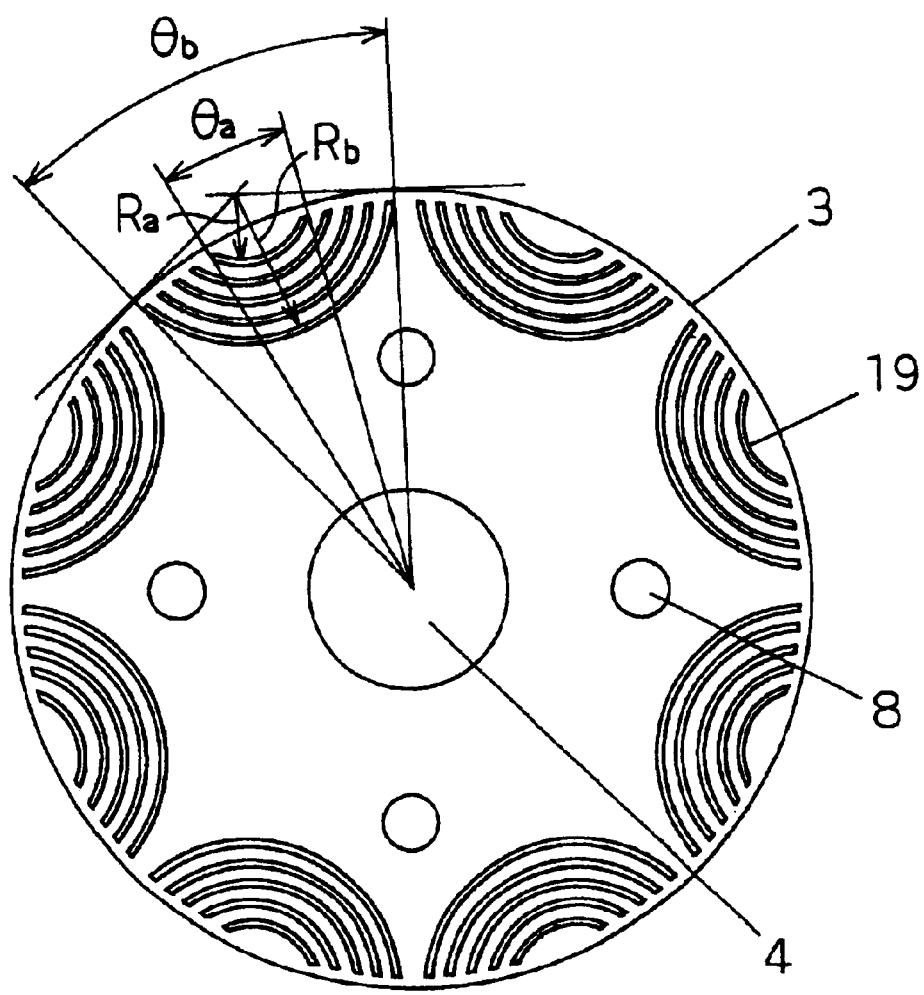
FIG. 7 is a front view showing a second rotator portion according to the second embodiment of the present invention.

With reference to FIG. 7, the description will be made of a second embodiment of the present invention.

In a motor according to the second embodiment, as described in the first embodiment, there are provided two first rotator portions each having a permanent magnet, a second rotator portion having magnetic saliency is inserted between those first rotator portions, and those are coupled and fixed in the direction of the rotating shaft to constitute a rotor. In this case, for the second rotator portion, a so-called switched reluctance motor system of rotor is used in the first embodiment. However, since for the second rotator portion, any motor may be used as long as it is a reluctance motor, there may be used a rotator portion having so-called synchronous reluctance motor system rotor structure, obtained by cutting such slit 19 as shown in FIG. 7 into multi-layer.

At this time, assuming a diameter of a slit nearest to the outer diameter of the rotor to be Ra, its angle to be θa, a diameter of a slit nearest to a center of the rotor to be Rb and its angle to be θb, those are assumed to satisfy the following (Numerical Formula 2) relation using r1 and θ1 of FIG. 2.

Ra<r1<Rb, θa<θ1<θb (Numerical Formula 2)

By constructing the rotor as described above, the similar effect to the first embodiment can be obtained, and moreover, a motor with cogging torque and torque ripple reduced can be obtained.

Figure 8:
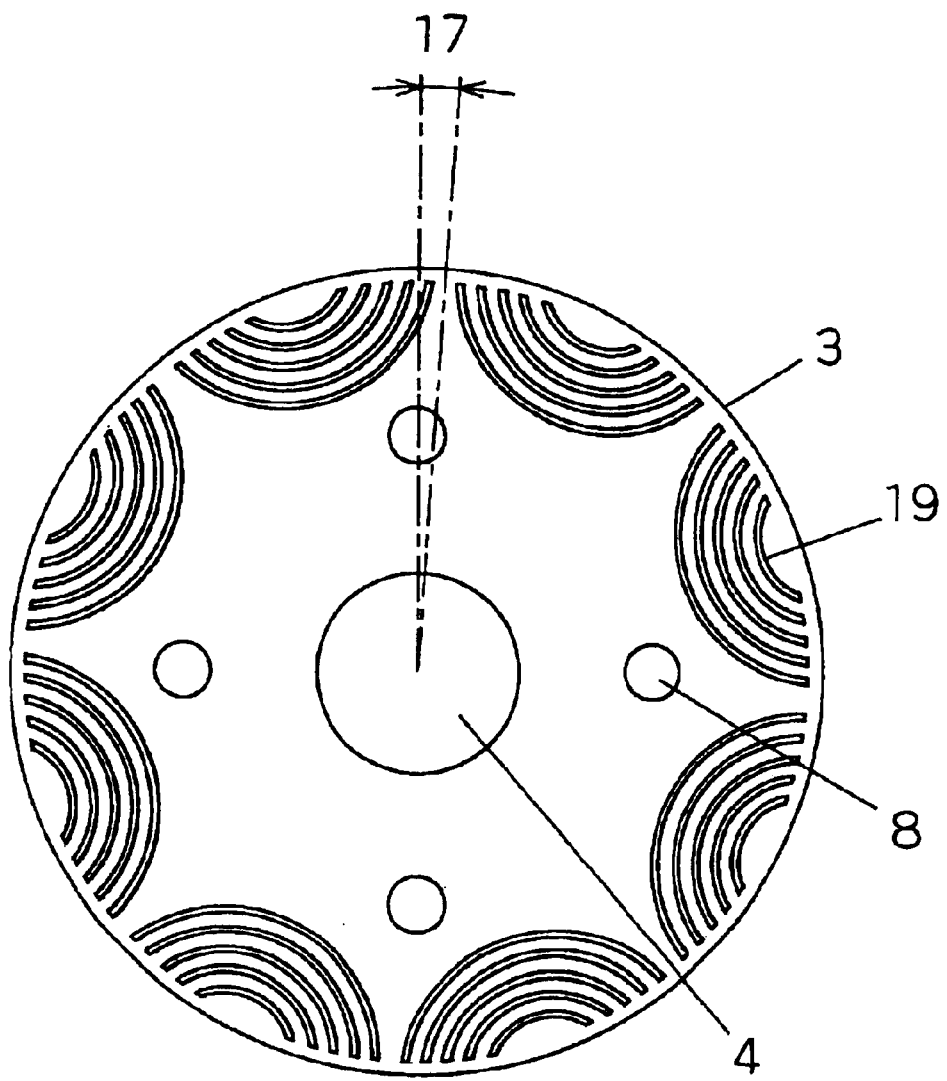
FIG. 8 is a front view showing another second rotator portion according to the second embodiment of the present invention.

In this respect, as in the case of the first embodiment, between when the first rotator portion is used by itself, and when the second rotator portion is used by itself, in order to cause both current phases for generating the maximum torque respectively to coincide with each other, the second rotator portion is deviated by a phase shift 17 as shown in FIG. 8, and the first rotator portion and the second rotator portion are coupled and fixed in a direction of the same rotating shaft to constitute a rotor, whereby the maximum torque can be further increased and a higher-output motor can be manufactured with the motor size further reduced.

Also, the first rotator portion 2 and the second rotator portion 3 are preferably stacked in such a manner that the permanent magnet 1 of the first rotator portion 2 and a full or partial slit 19 in a region, to which the second rotator portion 3 corresponds, overlap each other.

(Third Embodiment)

Figure 9:
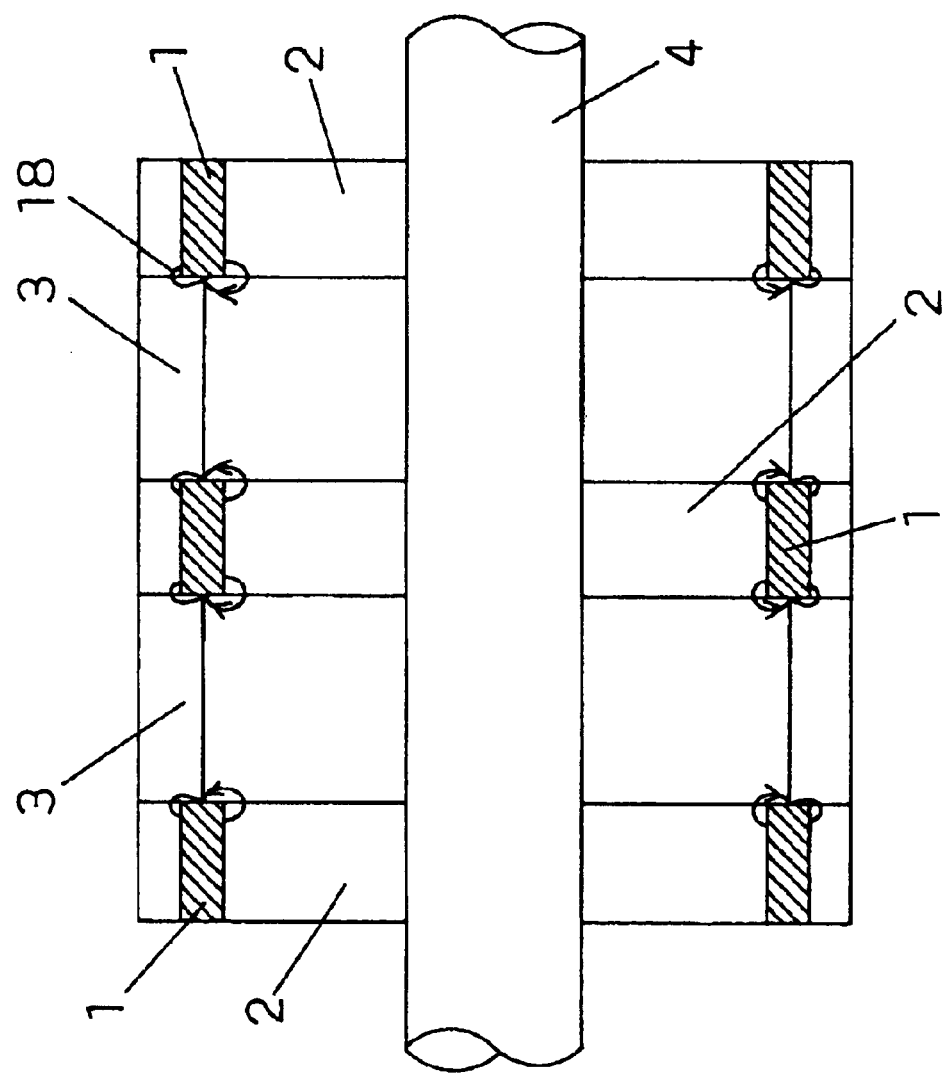
FIG. 9 is a sectional view showing a motor according to a third embodiment of the present invention.

With reference to FIG. 9, the description will be made of a third embodiment of the present invention.

In the first embodiment, one second rotator portion 3 has been inserted between two first rotator portions 2, but the structure may be arranged such that as shown in FIG. 9, there are provided three first rotator portions 2 and two second rotator portions 3 and the second rotator portion 3 is inserted between two first rotator portions 2, which are adjacent to each other, respectively.

By the adoption of such structure, the similar effect to the first and second embodiments can be obtained, and in addition, since two stages of sandwich-shaped structure are coupled, the effect becomes more significant, and a further increase in the motor output and further miniaturization of the motor can be expected.

Figure 10:
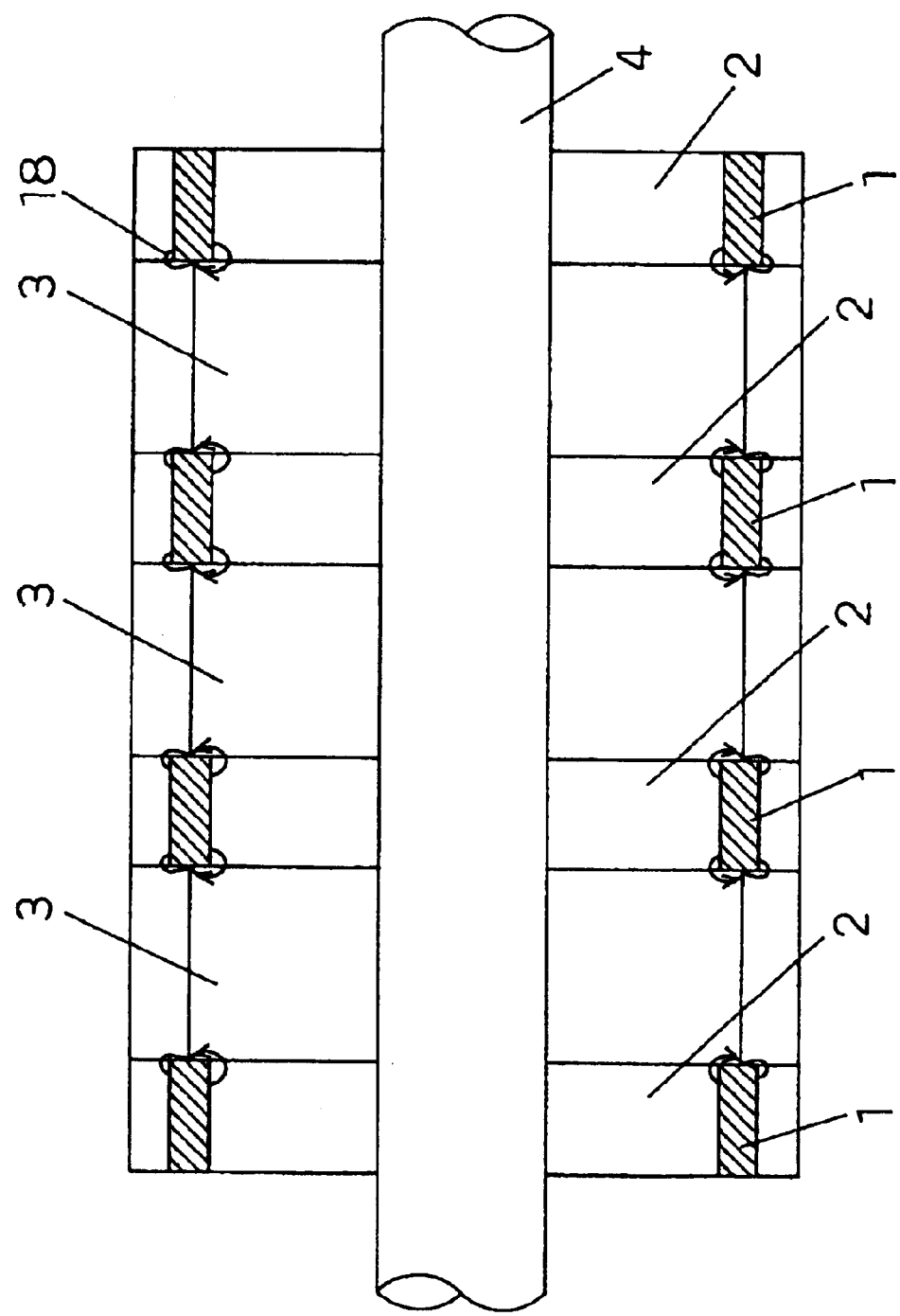
FIG. 10 is a sectional view showing another motor according to the third embodiment of the present invention.

Further, if, as shown in FIG. 10, the sandwich-shaped structure of the first rotator portions 2 and the second rotator portion 3 is coupled in three stages in the direction of the rotating shaft or in more stages than three, the above-described effect will be obtained more significantly.

Finally, in the case where the motor according to each of the above-described embodiments is combined with an internal combustion engine to constitute a hybrid electric vehicle system, generated voltage, which is generated, can be made low even if a rotor of a motor, to which the driving shaft is directly coupled, rotates while driven only by the engine. Accordingly, iron loss, which is caused, can be made small, and therefore, it becomes possible to construct a higher-efficiency hybrid system and to further improve the fuel consumption.

In this respect, the second rotator portion 3 according to the third embodiment may be constructed as shown in FIG.

3, or as shown in FIG. 7. Also, as regards coupling between the first rotator portion 2 and the second rotator portion 3, the coupling is preferably performed in such a manner that the permanent magnet 1 of the first rotator portion 2 and at least one of the notch 9 or the slit 19 of the second rotator portion 3 overlap each other as described with reference to the FIG. 11.

Also, in each of the above-described embodiments, the description has been made of a case where the first rotator portion 2 having the permanent magnet 1 has been coupled to the second rotator portion 3 having no permanent magnet, but any two first rotator portions 2 are coupled to each other and the second rotator portion 3 may not be inserted between those first rotator portions 2. In other words, all first rotator portions 2 may not be coupled to the second rotator portion 3.

A driving unit having at least a motor according to each of the above-described embodiments, and fuel cell also belongs to the present invention, and when the driving unit is installed to an automobile, since a back electromotive force to be applied to the fuel cell is restrained to be small even if the invertor or the like is out of order during high-speed traveling of the automobile, a safe, small-sized and high-output driving unit can be obtained.

Further, an electric vehicle provided with the above-described driving unit also belongs to the present invention. Therefore, it is possible to provide a small-sized, high-output and safe fuel-cell electric vehicle having long travel distance per charging.

As apparent from the above description, the present invention is capable of providing a small-sized, high-output, and high-efficiency motor, which restrains occurrence of generated voltage.

In this respect, structure of the above-described motor according to the present invention is applicable to not only the electric vehicle, but also, for example, a motor for a hybrid electric vehicle to be described hereinafter.

Next, with reference to the drawings, the description will be made of a hybrid electric vehicle according to an embodiment of the present invention.

(Embodiment B1)

Figure 14:
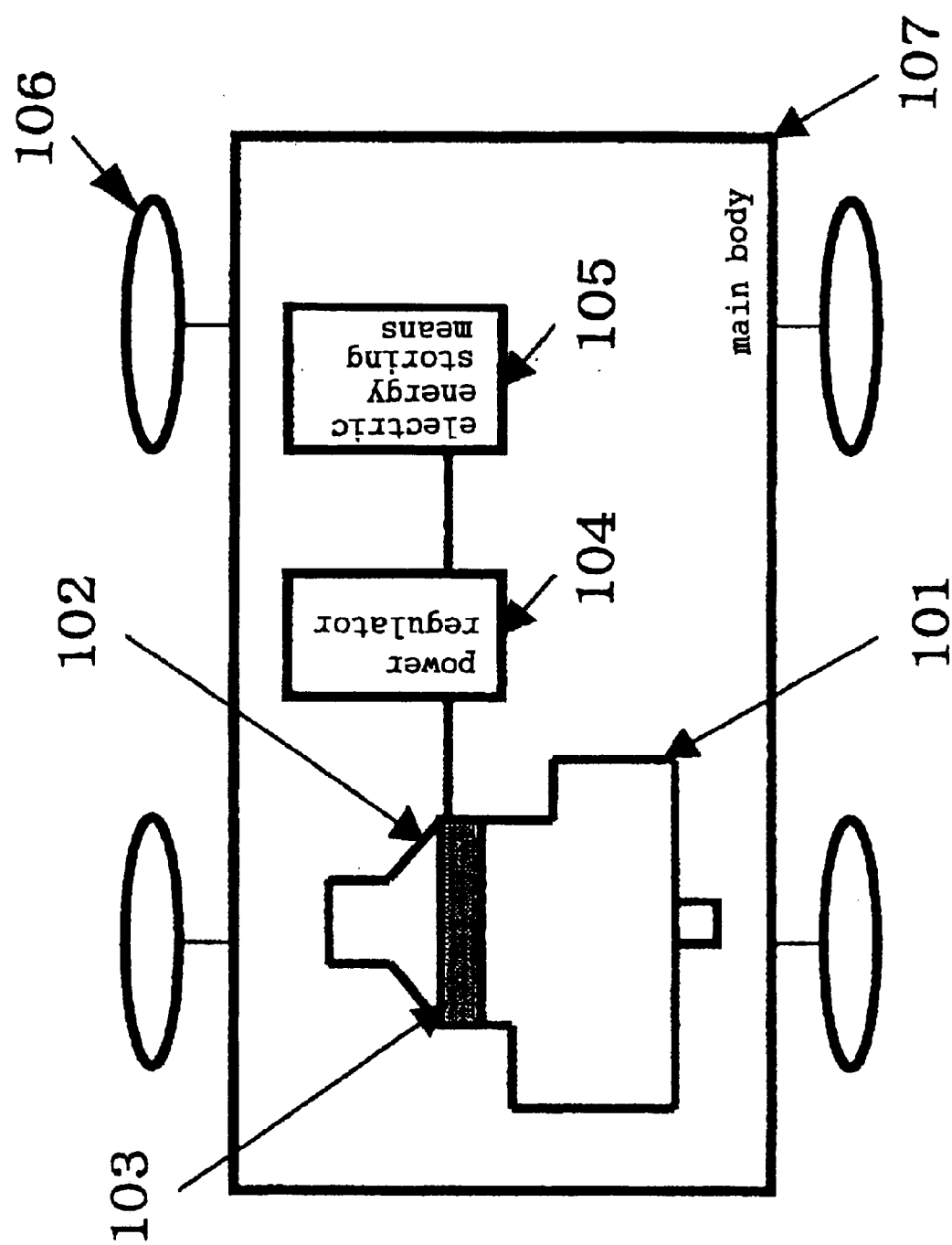
FIG. 14 is a schematic block diagram showing a hybrid electric vehicle according to an embodiment B1 of the present invention.

FIG. 14 is a block diagram showing a hybrid electric vehicle according to an embodiment B1 of the present invention.

In FIG. 14, reference numeral 101 denotes a power source for the hybrid electric vehicle, an engine to be driven using fuel; 102, a transmission; 103, a motor capable of becoming a power source for a vehicle together with the engine 1, or independently; 105, electric energy storing means such as a battery; 104, a power regulator for converting an electric power to be transmitted from the electric energy storing means 105 to the motor 103 or an electric power to be transmitted from the motor 103 to the electric energy storing means 105; 107, a main body for constituting the hybrid electric vehicle; and 106, wheels for driving the main body 107.

Figure 20:
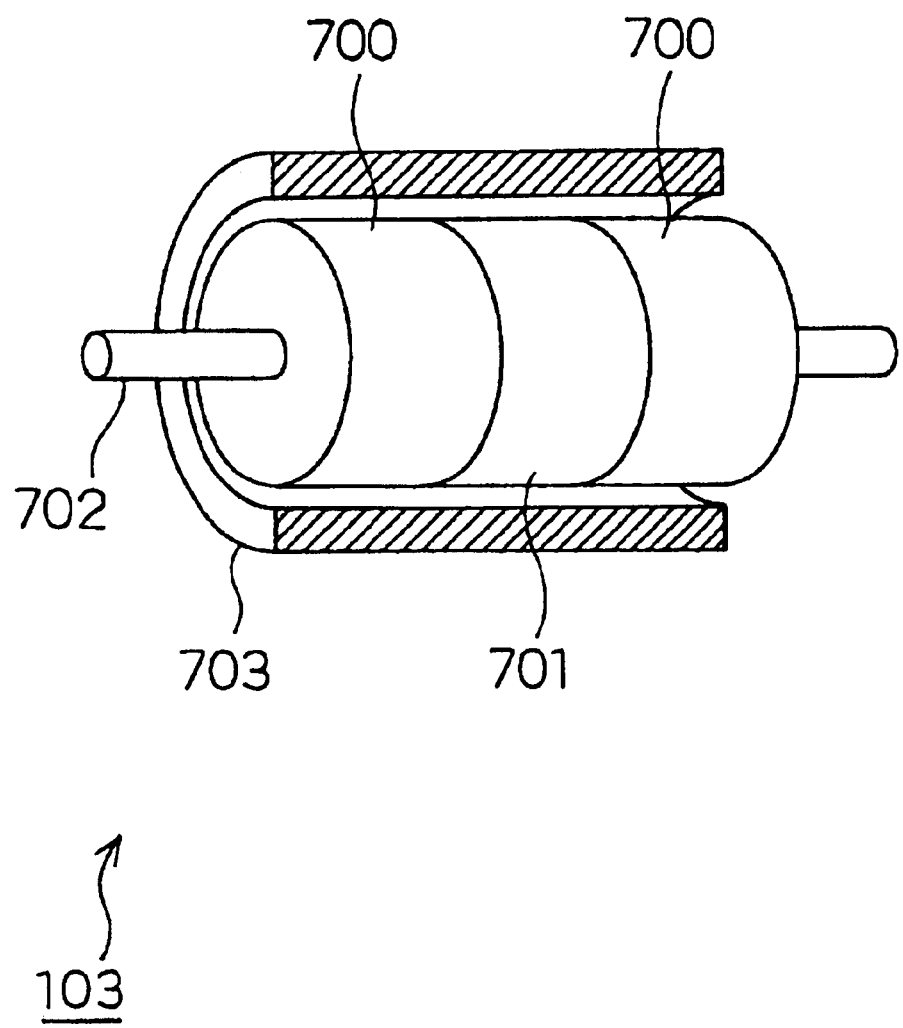
FIG. 20 is a schematic block diagram showing a motor for use with a hybrid electric vehicle according to an embodiment of the present invention.

FIG. 20 is a schematic block diagram showing a motor 103 for use in the hybrid electric vehicle according to the present embodiment. In FIG. 20, a motor 103 has a rotor constituted by a first rotator portion 700 having a permanent magnet, for operating as a magneto motor, a second rotator portion 701 having magnetic saliency, for operating as a reluctance motor, and a rotating shaft 702, and a stator 703 provided around the rotor, for generating a field system which drives the rotor by supplying current.

In this respect, the detailed structure of the motor shown in FIG. 20 is the same as the structure of the motor (described in, for example, FIG. 1) described in the embodiment. In other words, the first rotator portion 700, the second rotator portion 701, the rotating shaft 702 and the stator 703 correspond to the first rotator portion 2, the second rotator portion 3, the rotating shaft 4 and the stator 7 respectively.

In this respect, in the motor for use with a hybrid electric vehicle according to the present invention, the first rotator portion and the second rotator portion are constructed to be coupled to each other in the direction of the rotating shaft, and in the present embodiment, the second rotator portion 701 has been constructed to be interposed between two first rotator portions 700 as shown in the figure. However, the structure of the first rotator portion 700 and the second rotator portion 701 is not limited thereto, but the first rotator portion 700 may be constructed to be interposed between two second rotator portions 701.

Also, one each of the first rotator portion 700 and the second rotator portion 701 may be constructed to be coupled. Briefly speaking, the first rotator portion 700 and the second rotator portion 701 according to the present invention can be constructed to be coupled in the direction of the rotating shaft 702 irrespective of the respective numbers.

The hybrid electric vehicle of the present embodiment, having such structure has a motor 103 provided with: a rotor 702 comprising the first rotator portion 700 having a permanent magnet and the second rotator portion 701 having magnetic saliency coupled in the direction of the rotating shaft; and a stator which generates a field system for driving the rotor by supplying current.

By mounting the motor 103 onto the vehicle as a power source, the hybrid electric vehicle is capable of maintaining the same output as the conventional motor by means of output due to reluctance torque to be generated by the second rotator portion 701 as motor output as compared with a hybrid electric vehicle system using the conventional magneto motor.

Moreover, even when the motor 3 is rotated by the engine 1 while the motor 103 is in an operation-stopped state, or when the motor 103 is rotated for a cause that the hybrid electric vehicle is traveling downhill, or the like, since an amount of a permanent magnet for use with the rotor is reduced, it is possible to restrain the occurrence of generated voltage, to reduce iron loss of the motor, to set rated output and efficiency of the motor to the same or higher level, and to increase travel distance per charging of the hybrid electric vehicle.

In this respect, on operating the motor 103, leakage flux of permanent magnets disposed in the first rotator portions 700 at both ends is caused to go round to the second rotator portion 701 from both sides to magnetically saturate the second rotator portion for thereby raising a salient pole ratio of the second rotator portion 701. Thereby, it is possible to increase reluctance torque caused in the second rotator portion, and to thereby obtain output equal to or higher than the conventional example.

Also, even when the motor 103 is in an operation-stopped state, that is, when the vehicle is traveling at high speed only by the output from the engine 101, since an amount of magnet for use with the rotor is reduced, it is possible to reduce voltage generated by rotation of the motor during the rotation at high speed, and to prevent the electric energy storing means 105 such as a power supply battery from being deteriorated and damaged.

(Embodiment B2)

Figure 15:
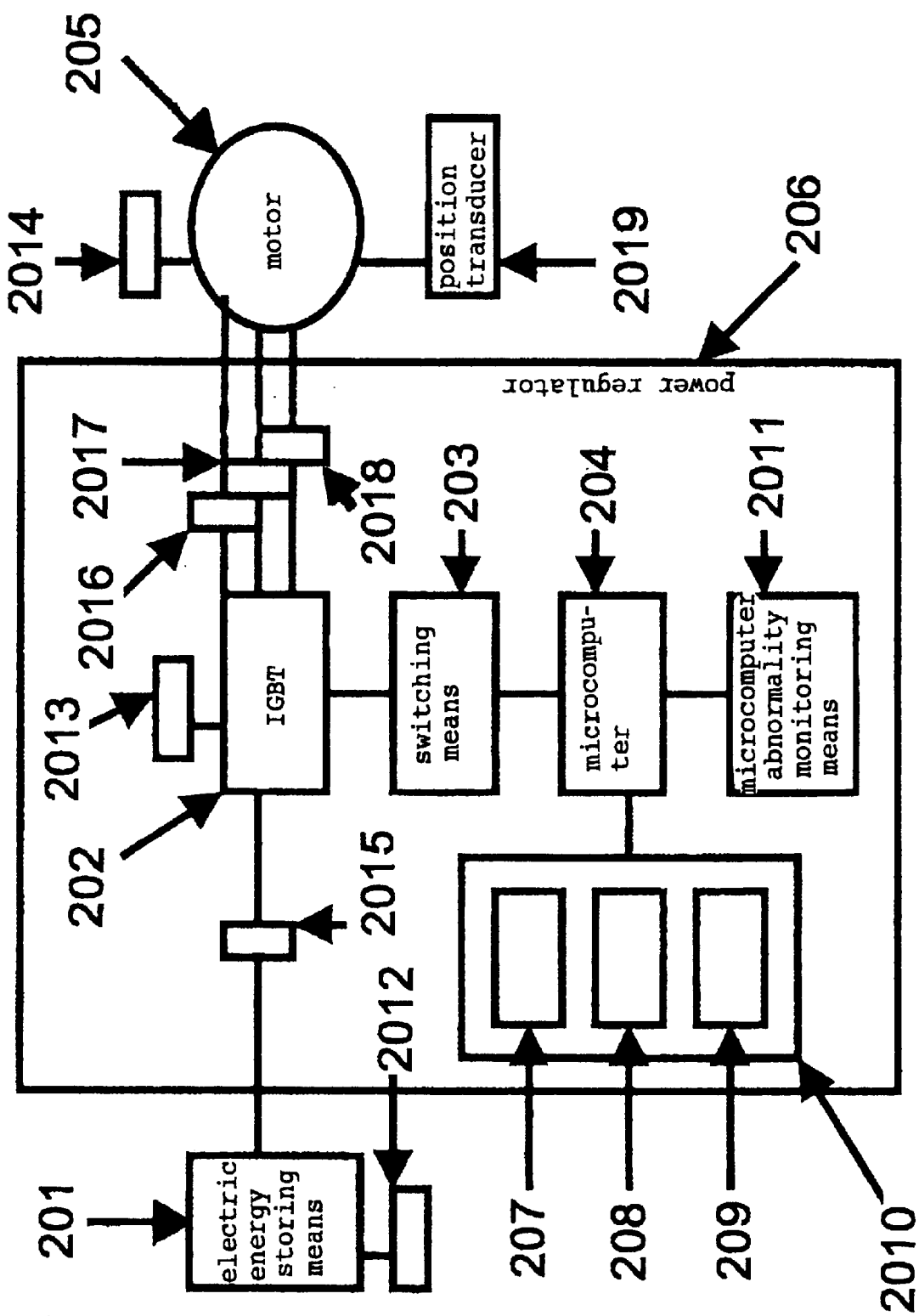
FIG. 15 is a block diagram showing a motor driving system of a hybrid electric vehicle according to an embodiment B2 of the present invention.

FIG. 15 is a block diagram showing a system for driving a motor for a hybrid electric vehicle according to an embodiment B2 of the present invention.

In FIG. 15, reference numeral 201 denotes electric energy storing means to be realized by, for example, a battery or the like; 202, a semiconductor for converting electric power, such as IGBT (an example of high-power transistor); 203, switching means of turning a semiconductor 2 ON/OFF; 205, a motor according to the present embodiment B1, provided with: a rotor comprising the first rotator portion having a permanent magnet and the second rotator portion having magnetic saliency coupled in the direction of the rotating shaft; and a stator which generates a magnetic field for driving the rotor by supplying current; and 204, a microcomputer including control means of the motor 205.

Also, reference numeral 206 denotes a power regulator for converting electric power to be transmitted from electric energy storing means 201 to the motor 205, or electric power to be transmitted from the motor 205 to the electric energy storing means 201; 207, voltage monitoring means of monitoring voltage of the electric energy storing means 201; and 208, current monitoring means of monitoring current of the electric energy storing means 201.

Also, reference numeral 209 denotes temperature monitoring means of monitoring temperature of the electric energy storing means 201; 2010, abnormality monitoring means including the voltage monitoring means 207, the current monitoring means 208, temperature monitoring means 9 or the like; 2011, microcomputer abnormality monitoring means of monitoring the microcomputer 204; 2012, a temperature sensor for sensing temperature of the electric energy storing means 201; 2013, a temperature sensor for sensing temperature of the semiconductor 204; and 2014, a temperature sensor for sensing temperature of the motor 205.

Also, reference numeral 2015 denotes a current detector for detecting electric current for flowing in or flowing out of electric energy storing means 201; 2016 to 2018, current detectors for detecting electric current for flowing in or flowing out of the motor 205; and 2019, a position transducer of the rotor for the motor 205.

Hereinafter, the description will be made of an operation of a hybrid electric vehicle according to the present embodiment B2, constructed as described above. In this respect, in the following description, the electric energy storing means 201 will be described with a battery as an example.

To begin with, when the microcomputer 204 is normally operating, the voltage monitoring means 207 within the abnormality monitoring means 2010 monitors voltage of the battery, the current monitoring means 208 monitors current, and the temperature monitoring means 209 monitors temperature.

If a dangerous state, that is, any of the following states to be caused by overcharge, over discharge or the like occurs on the battery, an operation to be described hereinafter will be performed.

More specifically, when all or any of the following cases: when voltage exceeds tolerance, when current is going to flow in at voltage exceeding the tolerance, when current is going to flow out at voltage equal to or lower than the tolerance and when temperature exceeds the tolerance, occurs, the abnormality monitoring means 2010 outputs an abnormality detecting signal to the microcomputer 204 in response to an excess of these tolerance, and on receipt of the abnormality detecting signal, the microcomputer 204 outputs a semiconductor OFF command signal to the switching means 203, which turns OFF the semiconductor 202.

This operation interrupts the electric power from the motor 205 to the battery, or the electric power from the battery to the motor 205 to enable the battery to be protected.

In the above-described operation, if the current monitoring means 208 or the current detector 2015 goes into an abnormal state and cannot detect abnormality of current in the battery, the temperature sensor 2012 will detect that the battery temperature exceeds the tolerance. Thus, on the basis of this detection result, the abnormality monitoring means 2010 will output an abnormality detecting signal to the microcomputer 204.

Next, the microcomputer 204 outputs a semiconductor OFF command signal to the switching means 203, which turns OFF the semiconductor 202 to thereby protect the battery.

Also, even when the voltage monitoring means 207 goes into an abnormal state and cannot detect abnormality in voltage of the battery, the temperature sensor 2012 detects that the battery temperature exceeds the tolerance, on the basis of which, the abnormality monitoring means 2010 outputs an abnormality detecting signal to the microcomputer 204.

Next, the microcomputer 204 outputs a semiconductor OFF signal to the switching means 203 and the switching means 203 turns OFF the semiconductor 202, whereby the battery can be protected in the same manner as when the current monitoring means 208 is in an abnormal state.

On the other hand, if the microcomputer 204 is abnormal, the battery will go into a dangerous state as described above, and the microcomputer 204 will not normally output any semiconductor OFF command signal to the switching means 203 even if the microcomputer 204 inputs an abnormality detecting signal from the abnormality monitoring means 2010. For this reason, there is a possibility that there occurs a disadvantage that the switching means 203 cannot turn OFF the semiconductor 202.

In the present embodiment, in order to prevent such a disadvantage as described above from occurring, the microcomputer abnormality monitoring means 2011 is adapted to always monitor the microcomputer 204.

Thereby, it is possible to protect the battery even when the microcomputer 204 becomes abnormal because the microcomputer abnormality monitoring means 2011 directly controls the switching means 203, and the switching means 203 outputs a semiconductor OFF signal to the semiconductor 202 to turn OFF the semiconductor 202.

Even when the microcomputer 204 goes into an abnormal state, this operation interrupts the electric power from the motor 205 to the battery, or the electric power from the battery to the motor 205 to enable the battery to be protected.

(Embodiment B3)

Figure 16:
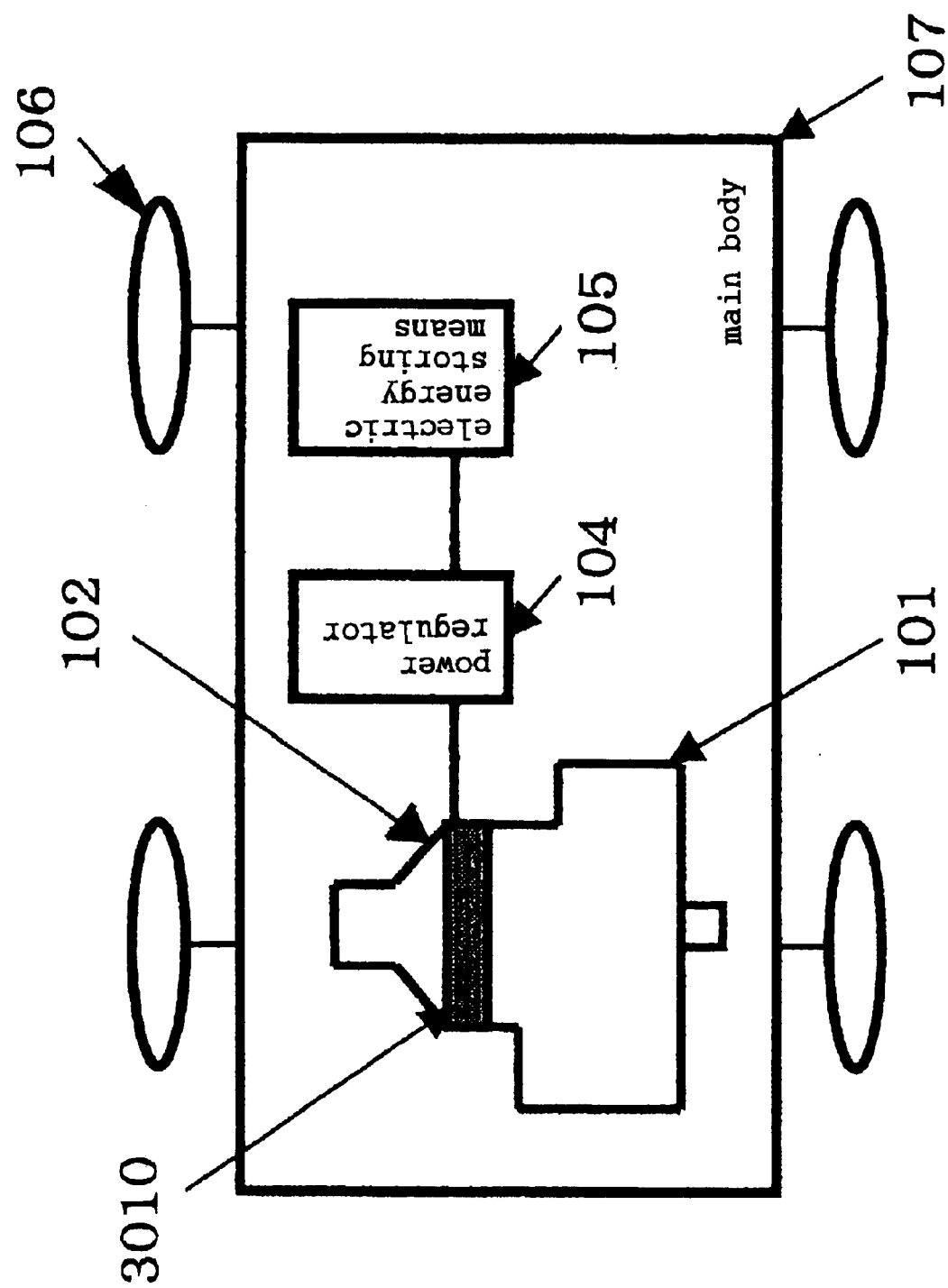
FIG. 16 is a schematic block diagram showing a hybrid electric vehicle according to an embodiment B3 of the present invention.

FIG. 16 is a block diagram showing a hybrid electric vehicle according to an embodiment B3 of the present invention. In FIG. 16, components identical to those in FIG. 14 are designated by the identical reference numerals. Also, reference numeral 3010 denotes a motor.

A hybrid electric vehicle according to the present embodiment is different from the embodiment B1 in structure of the motor 3010.

Figure 21:
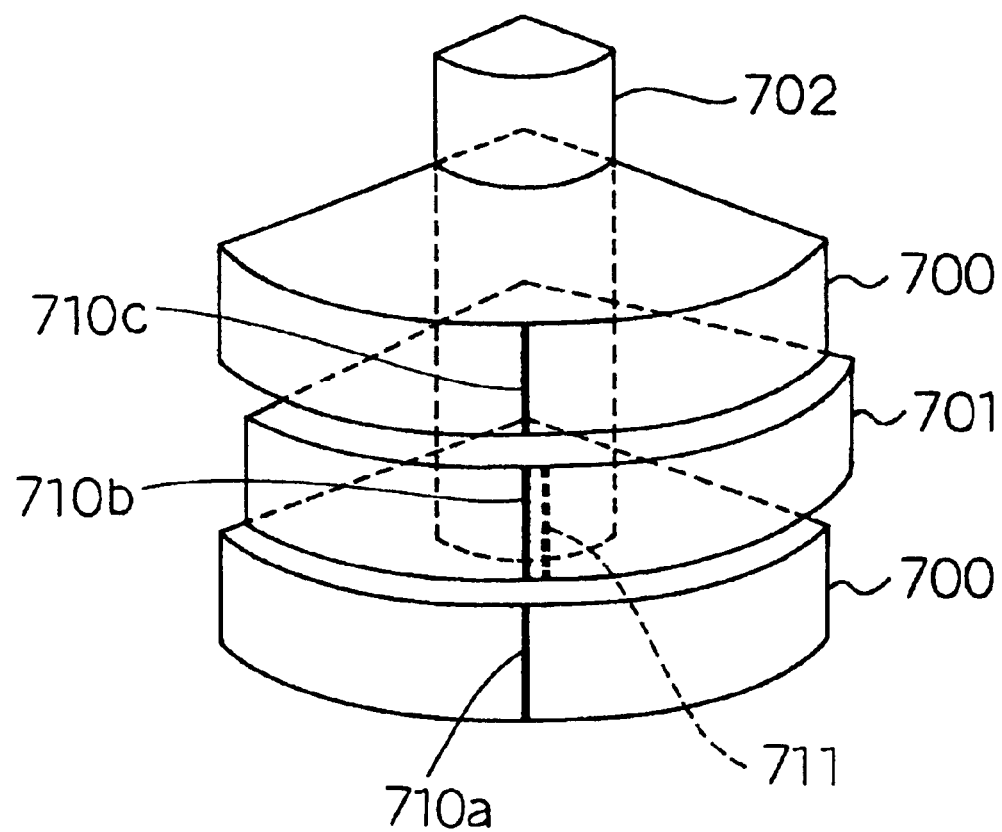
FIG. 21 is a four-part split view showing a rotor of a motor for use with a hybrid electric vehicle according to the embodiment of the present invention.

More specifically, a motor 3010 in a hybrid electric vehicle according to the present embodiment, equipped with (1) a rotor comprising a first rotator portion 700 having a permanent magnet and a second rotator portion 701 having magnetic saliency coupled in an axial direction of a rotating shaft 702, and (2) a stator, which generates a field system for driving the rotor by supplying current as shown in FIG. 21, where in the first rotator portion 700 and the second rotator portion 701 are constructed to be combined at such a mechanical angle that current phases for generating maximum torque respectively are actually in phase.

In this respect, FIG. 21 is a perspective view for schematically showing, when a rotor of the motor 3010 is split into four parts, one of those four parts split.

In FIG. 21, each position, in which maximum torque is caused, is represented by reference numerals 710a to 710c, and an initial position is represented by a reference numeral 711. The initial position 711 indicates the position before the mechanical angle is shifted to a position where the maximum torque is caused.

According to a hybrid electric vehicle of the present embodiment, having such structure, there is mounted a motor 3010 equipped with a rotor comprising a first rotator portion 700 having a permanent magnet and a second rotator portion 701 having magnetic saliency coupled in a direction of a rotating shaft 702 at such a mechanical angle that current phases for generating maximum torque respectively are in the same phase and a stator, which generates a field system for driving the rotor by supplying current, whereby the following effect is exhibited.

In other words, since high output using reluctance torque can be realized as the motor output, output equal to the hybrid electric vehicle system using a conventional magneto motor can be maintained. Moreover, even when rotated in synchronization with a driving force of the engine 101, which is in operation, while the motor is in an operation-stopped state, or when the motor 3 is rotated for a cause that the hybrid electric vehicle is traveling downhill, or the like, since an amount of magnet for use with the rotor is reduced, it is possible to restrain the occurrence of generated voltage, to reduce iron loss, and to extend travel distance per charging of the hybrid electric vehicle.

In this case, as in the embodiment B1, on operating the motor 3010, leakage flux of permanent magnets disposed in the first rotator portions 700 at both ends is caused to go round to the second rotator portion 701 from both sides to magnetically saturate the second rotator portion for thereby raising a salient pole ratio of the second rotator portion 701. Thereby, it is possible to increase reluctance torque caused in the second rotator portion, and to thereby obtain output equal to or higher than the conventional example.

Also, even when the motor 3010 is in an operation-stopped state, that is, when the vehicle is traveling at high speed only by the output from the engine 1, since an amount of a magnet for use with the rotor is reduced, it is possible to reduce voltage generated by rotation of the motor 3 during the rotation at high speed, and to prevent the electric energy storing means 5 such as a power supply battery from being deteriorated and damaged.

Further, since the first rotator portion 700 and the second rotator portion 701 are capable of outputting the maximum torque respectively, the motor 3010 is capable of obtaining higher output, whereby there is the effect that a high-efficiency hybrid electric vehicle can be obtained.

(Embodiment B4)

Figure 17:
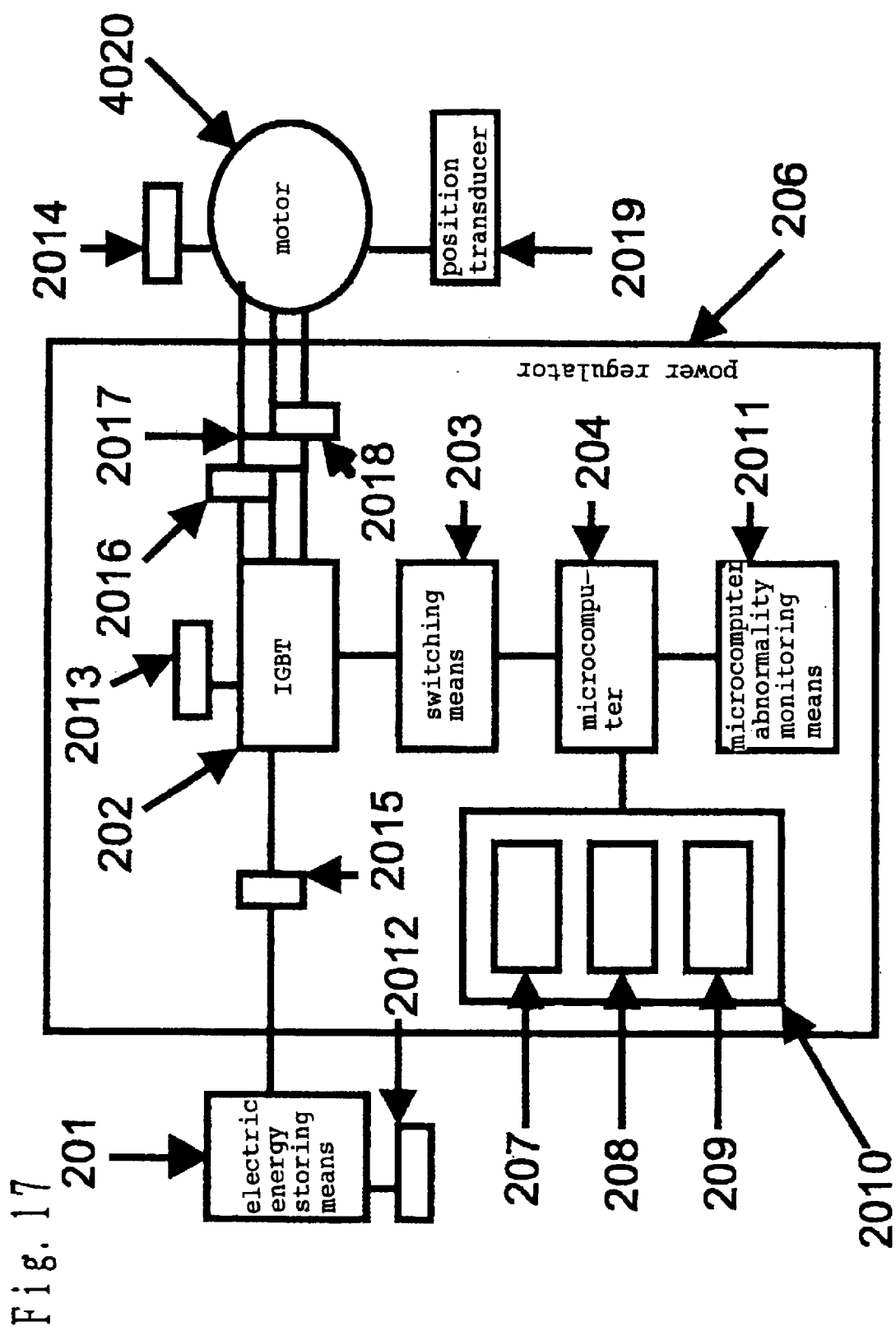
FIG. 17 is a block diagram showing a motor driving system of a hybrid electric vehicle according to an embodiment B4 of the present invention.

FIG. 17 is a block diagram showing a motor driving system of a hybrid electric vehicle according to an embodiment B4 of the present invention.

In FIG. 17, components identical to those in FIG. 15 are designated by the identical reference numerals. Also, reference numeral 4020 denotes a motor, which has the same structure as the motor 3010 described in the embodiment B3.

A hybrid electric vehicle having the above-described structure, according to the present embodiment uses, in a system for driving a motor, mounted with abnormality monitoring means 2010 of monitoring any abnormality of the electric energy storing means 201 and the microcomputer abnormality monitoring means 2011, which has been described in the embodiment B2, a motor equipped with a rotor comprising a first rotator portion having a permanent magnet and a second rotator portion having magnetic saliency coupled in an direction of the rotating shaft at such a mechanical angle that current phases for generating maximum torque respectively, are in the same phase and a stator, which generates a field system for driving the rotor by supplying current, which have been described in the embodiment B3.

Therefore, the operations of the abnormality monitoring means 2010 and the microcomputer abnormality monitoring means 2011 in a system for driving the motor of a hybrid electric vehicle according to the present embodiment are performed in the same manner as the embodiment B2, and the same effect can be obtained.

(Embodiment B5)

Figure 18:
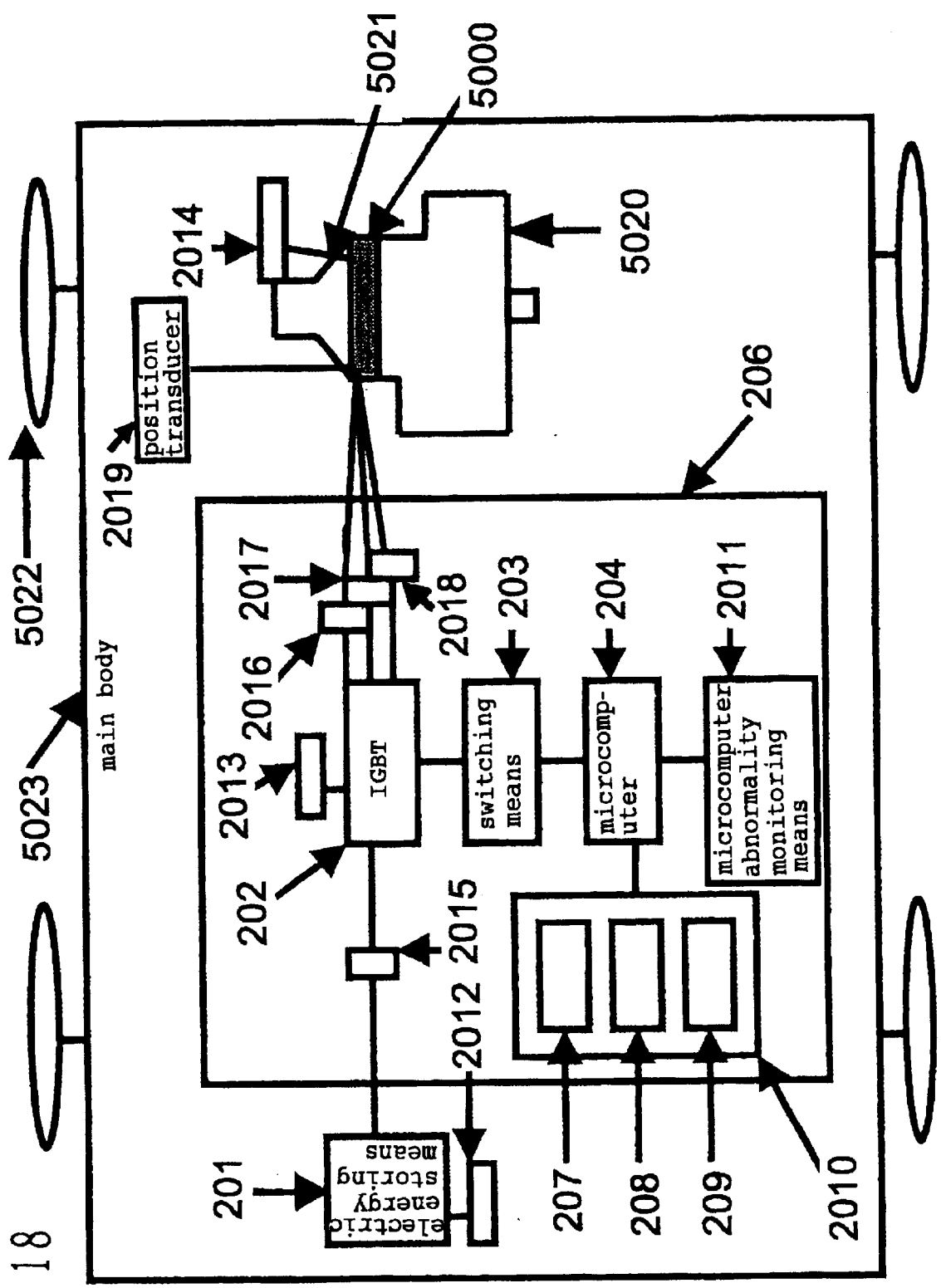
FIG. 18 is a schematic block diagram showing a hybrid electric vehicle according to an embodiment B5 of the present invention.

FIG. 18 is a schematic block diagram showing a hybrid electric vehicle system according to each of the above-described embodiments.

In FIG. 18, components identical to those in FIGS. 15 and 17 are designated by the identical reference numerals, and description thereof will be omitted.

Reference numeral 5020 denotes a conventional traveling source for a vehicle, an engine to be driven using fuel; 5021, transmission; 5023, a main body constituting a hybrid electric vehicle; 5022, wheels for driving the main body 107. However, a rotor for the motor 4020 is assumed to be directly or indirectly coupled to the driving shaft of the hybrid electric vehicle. Also, a motor 5000 is a motor to be used in the present embodiment B1 or B3.

According to a hybrid electric vehicle of the present embodiment, having such structure, when the hybrid electric vehicle is traveling only by the engine output, or traveling downhill by inertia, or is being towed by any external separate vehicle or the like, and the motor 4020 is in an operation-stopped state (energizing-interrupted state of motor), since an amount of a magnet for use with the rotor of the motor 5000 is reduced although the rotor of the motor 5000 rotates by the driving of the hybrid electric vehicle, it is possible to restrain the occurrence of generated voltage, to reduce iron loss, and further to extend travel distance per charging of the hybrid electric vehicle.

Also, even when the hybrid electric vehicle is traveling at high speed only by the output from the engine 20 as described above and the motor 5 is rotating at high speed, since an amount of magnet for use with the rotor is reduced, it becomes possible to reduce such high generated voltage as to exceed the power supply battery voltage like the conventional case, and to prevent electric energy storing means 201 to be realized by a power supply battery or the like from being deteriorated and damaged.

In a motor driving system for the hybrid electric vehicle, when the semiconductor 202 performs such ON/OFF control as to cause the electric energy storing means 201 to enter a dangerous state for a cause such as malfunction while generated voltage caused by rotation of the motor 5000 does not exceed the voltage of the electric energy storing means 201, the voltage monitoring means 207 or the current monitoring means 208, the abnormality monitoring means 2010 including the temperature monitoring means 209 outputs an abnormality detecting signal to the microcomputer 4, and the microcomputer 204 operates an OFF state of the semiconductor 202 including interrupted power supply of the semiconductor 202 to prevent the electric energy storing means 2010 from being deteriorated or damaged.

Next, when the microcomputer 204 does not recognizes any abnormality detecting signal from the voltage monitoring means 207 or the current monitoring means 208, the abnormality monitoring means 2010 including the temperature monitoring means 209, or when an abnormal condition is encountered in current command output for controlling the motor 5000 by the microcomputer 204, or when such an abnormal condition as not to recognize current from the current detector 2015 to 2018 is encountered in the microcomputer operation, the microcomputer abnormality monitoring means 2011 operates an OFF state of the semiconductor 202 including interrupted power supply, making it possible to prevent the electric energy storing means 2010 from being deteriorated or damaged.

Figure 19:
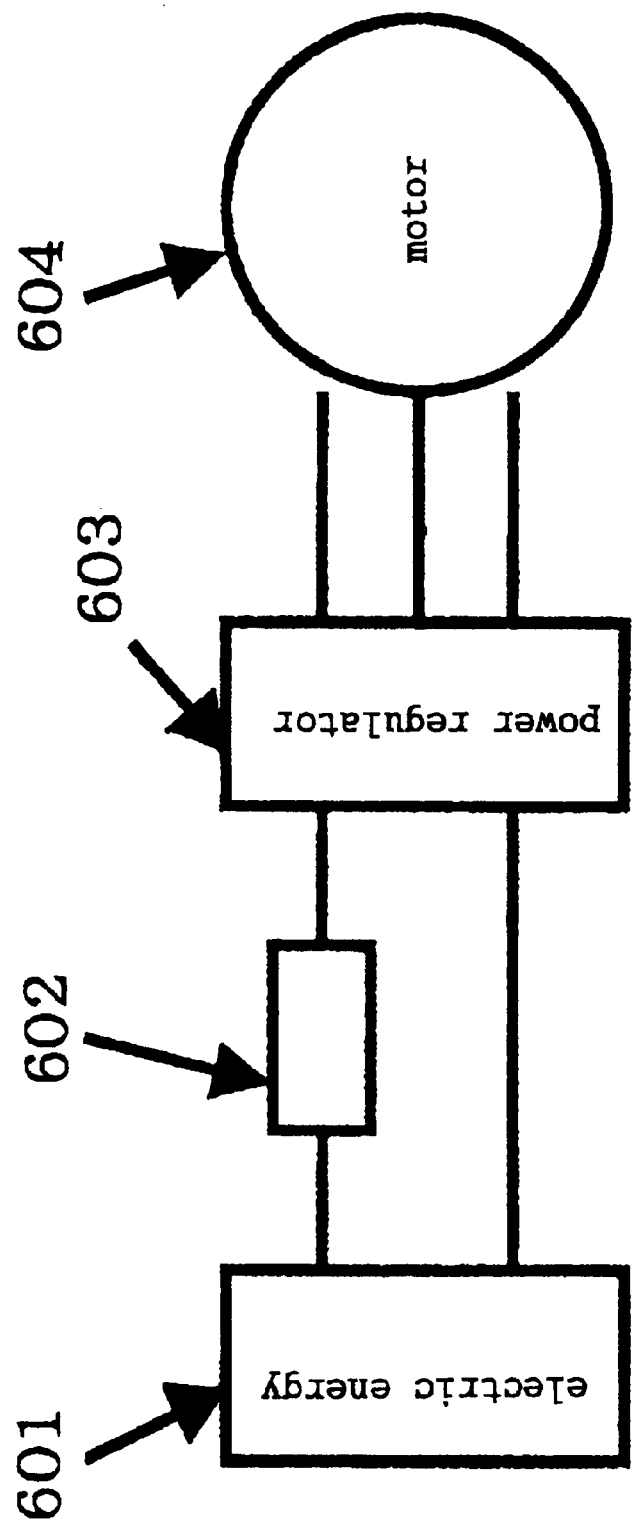
FIG. 19 is a block diagram showing a motor driving system of a hybrid electric vehicle according to a prior art.

FIG. 19 is a simplified block diagram showing a motor driving system of a hybrid electric vehicle system according to a prior art. In FIG. 19, reference numeral 601 denotes electric energy storing means such as a power supply battery; 603, a power regulator for converting the electric power from the electric energy storing means 601 to the motor 604 or from the motor 604 to the electric energy storing means 601; 604, a motor, which becomes a traveling source for driving the hybrid electric vehicle; and 602, a high-power relay for protecting the electric energy storing means 601 to be connected between the electric energy storing means 601 and the power regulator 603.

In this case, there is provided a motor equipped with a rotor comprising a first rotator portion having a permanent magnet and a second rotator portion having magnetic saliency coupled in the direction of a rotating shaft, and a stator, which generates a field system for driving the rotor by supplying current, according to the present embodiment B1 or B3, or a motor, comprising a first rotator portion having a permanent magnet and a second rotator portion having magnetic saliency combined at such a mechanical angle that current phases for generating maximum torque respectively, are in the same phase, and further, a power regulator according to the embodiment B2 or B4 is mounted, whereby it becomes possible to delete a high-power relay 602, which has been needed in the conventional structure, or to replace with a lower-priced semiconductor switch, thus making it possible to reduce the cost of the expensive high-power relay.

In this respect, in each of the above-described embodiments, for the characteristic properties of a motor to be mounted on the hybrid electric vehicle, high torque and high-speed area are not so much requested.

For this reason, in a hybrid electric vehicle according to the present invention, because of an increase in maximum speed of the motor alone resulting from lowered generated voltage of the motor, it becomes possible to delete complicated calculation for the conventional field weakening control or the like, the software can be downsized, and if constructed by hardware, the cost can be reduced by reducing circuit components or the like.

In this respect, power regulator control means according to the present invention corresponds to a microcomputer, a semiconductor, and switching means according to each embodiment, and power regulator monitoring means corresponds to the microcomputer abnormality monitoring means according to each embodiment.

As apparent from the foregoing description, according to the present invention, since high output based on reluctance torque can be realized as the motor output, there are exhibited the effects that it is possible to reduce iron loss, to extend travel distance per charging of the hybrid electric vehicle, and further to prevent the battery such as power supply from being deteriorated or damaged while the same output as the hybrid electric vehicle system using a conventional motor is maintained.

In addition, according to the present invention, it is possible to delete components of the large-sized relay, and to manufacture the hybrid electric vehicle at low cost.

What is claimed is:

1. A motor, comprising:

a rotor, comprising a plurality of first rotator portions, each having a permanent magnet, and one or a plurality of second rotator portions, each having magnetic saliency, at least two of said first rotator portions being separated in a direction of a longitudinal axis of a rotating shaft by at least one of said second rotator portions, at least one of said first rotator portions being magnetically coupled with at least one of said second rotator portions in a field where said first rotator portion and said second rotator portion are in complete magnetic contact without a non-magnetic member disposed therebetween, at least one of said second rotator portions having a plurality of inverted circular arc-shaped notches on a circumferential portion or a substantially circular plate or a substantially cylindrical column, and a full or partial contour portion of at least one of said notches opposes a respective one of said permanent magnet; and a stator which generates a magnetic field for driving said rotor when electric current is supplied.

2. The motor according to claim 1, wherein said plurality of first rotator portions are not arranged adjacent to each other.

3. The motor according to claim 1, wherein said first rotator portion and said second rotator portion are arranged adjacent to each other in such a manner that current phases for generating maximum torque for both the first rotator portion and the second rotator portion are in electrical phase with one another.

4. The motor winding according to claim 1, wherein said stator has a stator winding of distributed winding or a stator winding of concentrated winding.

5. A driving unit equipped with a motor according to any one of claims 1–2 and 3–4, and a fuel cell as power supply for said motor.

6. An electric vehicle comprising a driving unit according to claim 5.

7. The motor winding according to claim 1, wherein said second rotator portion defines said plurality of notches as voids to substantially magnetic flux leakage between said first rotator portion and said second rotator portion.

8. A motor, comprising:

a rotor, comprising a plurality of first rotator portions, each having a permanent magnet, and one or a plurality of second rotator portions, each having magnetic saliency, at least two of said first rotator portions being separated in a direction of a longitudinal axis of a rotating shaft by at least one of said second rotator portions, at least one of said first rotator portions being magnetically coupled with at least one of said second rotator portions, at least one of said second rotator portions having a plurality of inverted circular arc-shaped notches on a circumferential portion of a substantially circular plate or a substantially cylindrical column, and a full or partial contour portion of at least one of said notches opposes a respective one of said permanent magnet, said second rotator portion defining said plurality of notches as substantially air-filled voids to substantially prevent magnetic flux leakage between said first rotator portion and said second rotator portion; and a stator which generates a magnetic field for driving said rotor when electric current is supplied.

* * * * *

UNITED STATES PATENT AND TRADEMARK OFFICE
CERTIFICATE OF CORRECTION

PATENT NO. : 6,744,164 B2
DATED : June 1, 2004
INVENTOR(S) : Kadoya et al.

It is certified that error appears in the above-identified patent and that said Letters Patent is hereby corrected as shown below:

Title page,
Item [56], References Cited, FOREIGN PATENT DOCUMENTS,
delete "JP 2000050584 A * 2/2000 .............................. H02K/16/02".

Column 20,
Line 36, "1-2 and 3-4" should read -- 1, 2, 3 or 4 --.

Signed and Sealed this

Fourteenth Day of February, 2006

JON W. DUDAS
*Director of the United States Patent and Trademark Office*